US012015205B2

(12) United States Patent
Jin et al.

(10) Patent No.: US 12,015,205 B2
(45) Date of Patent: Jun. 18, 2024

(54) TRANSPARENT ANTENNA AND COMMUNICATION SYSTEM

(71) Applicants: Beijing BOE Sensor Technology Co., Ltd., Beijing (CN); BOE TECHNOLOGY GROUP CO., LTD., Beijing (CN)

(72) Inventors: Yunnan Jin, Beijing (CN); Chunnan Feng, Beijing (CN); Yong Li, Beijing (CN); Haoyang Zhang, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/783,327

(22) PCT Filed: Jul. 12, 2021

(86) PCT No.: PCT/CN2021/105712
§ 371 (c)(1),
(2) Date: Jun. 8, 2022

(87) PCT Pub. No.: WO2023/283756
PCT Pub. Date: Jan. 19, 2023

(65) Prior Publication Data

US 2024/0170854 A1 May 23, 2024

(51) Int. Cl.
*H01Q 1/38* (2006.01)
*H01Q 21/06* (2006.01)

(52) U.S. Cl.
CPC ............ *H01Q 21/064* (2013.01); *H01Q 1/38* (2013.01)

(58) Field of Classification Search
CPC .............................. H01Q 21/064; H01Q 1/38
See application file for complete search history.

(56) References Cited

U.S. PATENT DOCUMENTS

2003/0142018 A1* 7/2003 Lange .................... H01Q 1/007 343/897
2017/0012364 A1 1/2017 Yang et al.
2023/0063968 A1* 3/2023 Morimoto ............. H01Q 5/371

FOREIGN PATENT DOCUMENTS

CN 110941365 A 3/2020
CN 210778944 U 6/2020
(Continued)

OTHER PUBLICATIONS

Wang et al., "Design of Miniaturized Wideband Optically Transparent Antenna," J. Shanxi Univ., 2021, vol. 44, No. 3, pp. 531-535. English Abstract.

*Primary Examiner* — David E Lotter
(74) *Attorney, Agent, or Firm* — HOUTTEMAN LAW LLC

(57) ABSTRACT

The present disclosure provides a transparent antenna and a communication system, and belongs to the field of communication technology. The transparent antenna of the present disclosure includes: a first backplane and at least one radiating structure. The first backplane includes a first dielectric layer, a first electrode layer, a plurality of first transmission lines and a plurality of second transmission lines. The radiating structure includes a first antenna dielectric plate and a second antenna dielectric plate, where the first antenna dielectric plate includes a second dielectric layer, a first radiating element and a first balun feed structure. The second antenna dielectric plate includes a third dielectric layer, a second radiating element and a second balun feed structure.

20 Claims, 13 Drawing Sheets

(56) References Cited

FOREIGN PATENT DOCUMENTS

| | | | |
|---|---|---|---|
| CN | 111509380 | A | 8/2020 |
| CN | 211182518 | U | 8/2020 |
| CN | 111786110 | A | 10/2020 |
| CN | 112201946 | A | 1/2021 |
| CN | 112448105 | A | 3/2021 |
| CN | 112448159 | A | 3/2021 |

* cited by examiner

TRANSPARENT ANTENNA AND COMMUNICATION SYSTEM

TECHNICAL FIELD

The present disclosure relates to the field of communication technology, and particularly relates to a transparent antenna and a communication system.

BACKGROUND

With the continuous development of mobile communication technology, additional functional attributes for a glass window are increasingly remarkable. A combination application of an antenna and the glass window becomes one of the most representative applications. Since a traditional antenna can not be transparent, when the traditional antenna is used in combination with a transparent glass window, firstly, beauty of an overall environment of the glass window is influenced, secondly, due to a strong attenuation characteristic of the glass to electromagnetic waves, when the antenna is tightly attached to the glass window, the antenna cannot obtain effective electromagnetic energy radiation, and finally a problem of low gain of the antenna is caused. Therefore, designing an antenna scheme that can ensure high gain performance of the antenna and also ensure transparency of the antenna will become a trend of beautifying an antenna of 4G/5G.

SUMMARY

The present disclosure is directed to at least one of the technical problems of the related art, and provides a transparent antenna and a communication system.

In a first aspect, an embodiment of the present disclosure provides a transparent antenna, which includes:

- a first backplane including a first dielectric layer, a first electrode layer, a plurality of first transmission lines and a plurality of second transmission lines, where the first dielectric layer includes a first surface and a second surface which are opposite to each other, and the first electrode layer is located on the first surface of the first dielectric layer; the plurality of first transmission lines and the plurality of second transmission lines are located on the second surface of the first dielectric layer;
- at least one radiating structure, which is located on the second surface of the first dielectric layer, and each radiating structure includes:
  - a first antenna dielectric plate including a second dielectric layer, a first radiating element and a first balun feed structure, where the second dielectric layer includes a third surface and a fourth surface which are opposite to each other; the third surface of the second dielectric layer intersects the first surface of the first dielectric layer; the second dielectric layer is fixed on the second surface of the first dielectric layer; the first radiating element is located on the third surface of the second dielectric layer, and the first balun feed structure is located on the fourth surface of the second dielectric layer; the first balun feed structure is electrically connected with one of the first transmission lines, and the first radiating element is electrically connected with the first electrode layer;
  - a second antenna dielectric plate including a third dielectric layer, a second radiating element and a second balun feed structure, where the third dielectric layer includes a fifth surface and a sixth surface which are opposite to each other, the fifth surface of the third dielectric layer intersects the first surface of the first dielectric layer, the third dielectric layer intersects the second dielectric layer and is fixed on the second surface of the first dielectric layer; the second radiating element is located on the fifth surface of the third dielectric layer, and the second balun feed structure is located on the sixth surface of the third dielectric layer; the second balun feed structure is electrically connected with one of the second transmission lines, and the second radiating element is electrically connected with the first electrode layer.

In some implementations, at least one of the first electrode layer, the first radiating element, the second radiating element, the first balun feed structure, the second balun feed structure, the first transmission line, and the second transmission line is of a metal mesh structure.

In some implementations, the metal mesh has a line width (i.e., a width of each line of the metal mesh) ranging from 2 μm to 30 μm, a line thickness (i.e., a thickness of each line of the metal mesh) ranging from 1 μm to 10 μm, an a spacing between any two adjacent lines ranging from 50 μm to 250 μm.

In some implementations, the second dielectric layer has a first side edge and a second side edge opposite to each other; the third dielectric layer includes a third side edge and a fourth side edge opposite to each other, the first side edge and the third side edge both are fixed on the first dielectric layer;

- a first slot is provided in the first side edge of the second dielectric layer, a second slot is provided in the fourth side edge of the third dielectric layer, and the second dielectric layer and the third dielectric layer are inserted into each other through the first slot and the second slot; or
- a first slot is provided in the second side edge of the second dielectric layer, a second slot is provided in the third side edge of the third dielectric layer, and the second dielectric layer and the third dielectric layer are inserted into each other through the first slot and the second slot.

In some implementations, the first slot passes through a center of the second dielectric layer along a central axis of the first slot in a depth direction thereof; the second slot passes through a center of the third dielectric layer along a central axis of the second slot in a depth direction thereof, and the second side edge of the second dielectric layer and the fourth side edge of the third dielectric layer are coplanar.

In some implementations, the first radiating element is mirror-symmetrical with respect to the central axis of the first slot in the depth direction of the first slot as a symmetry axis;

- the second radiating element is mirror-symmetrical with respect to the central axis of the second slot in the depth direction of the second slot as a symmetry axis.

In some implementations, the first radiating element and the second radiating element are both T-shaped dipole oscillators.

In some implementations, the first radiating element includes a first dipole arm and a second dipole arm, the second radiating element includes a third dipole arm and a fourth dipole arm, the first antenna dielectric plate further includes a first director and a second director, and the second antenna dielectric plate further includes a third director and a fourth director;

the first director and the second director are both located on the third surface of the second dielectric layer, and the first director is located on a side of the first dipole arm away from the first backplane and the second director is located on a side of the second dipole arm away from the first backplane;

the third director and the fourth director are both located on the fifth surface of the third dielectric layer, and the third director is located on a side of the third dipole arm away from the first backplane, and the fourth director is located on a side of the fourth dipole arm away from the first backplane.

In some implementations, the first antenna dielectric plate includes a first metal layer on the third surface of the second dielectric layer; the second antenna dielectric plate includes a second metal layer on the fifth surface of the third dielectric layer; the first metal layer includes the first radiating element, the first director and the second director, and the second metal layer includes the second radiating element, the third director and the fourth director.

In some implementations, the second dielectric layer has a first connection portion and a second connection portion, the third dielectric layer has a third connection portion and a fourth connection portion, and the first dielectric layer has a first through hole, a second through hole, a third through hole and a fourth through hole therein;

the first connection portion is fixedly connected with the first through hole, and the second connection portion is fixedly connected with the second through hole, so that the second dielectric layer is fixedly connected with the first dielectric layer; the third connection portion is fixedly connected with the third through hole, and the fourth connection portion is fixedly connected with the fourth through hole, so that the third dielectric layer is fixedly connected with the first dielectric layer.

In some implementations, a first conductive portion is provided on the first connection portion, the first conductive portion being electrically connected to the first dipole arm; a second conductive portion is provided on the second connection portion, the second conductive portion being electrically connected to the second dipole arm; a third conductive portion is provided on the third connection portion, the third conductive portion being electrically connected to the third dipole arm; a fourth conductive portion is provided on the fourth connection portion, the fourth conductive portion being electrically connected to the fourth dipole arm;

a first connection pad corresponding to the first through hole, a second connection pad corresponding to the second through hole, a third connection pad corresponding to the third through hole and a fourth connection pad corresponding to the fourth through hole are provided on the first electrode layer; the first conductive portion is electrically connected with the first connection pad, the second conductive portion is electrically connected with the second connection pad, the third conductive portion is electrically connected with the third connection pad, and the fourth conductive portion is electrically connected with the fourth connection pad.

In some implementations, the transparent antenna further includes: a first feeding unit and a second feeding unit, each of the first feeding unit and the second feeding unit includes a first feeding port and at least one second feeding port;

one second feeding port of the first feeding unit is connected with one of the first transmission lines, and one second feeding port of the second feeding unit is connected with one of the second transmission lines.

In some implementations, the number of the first transmission lines and the number of the second transmission lines each are $2^n$, the first feeding unit includes n stages of third transmission lines, and the second feeding unit includes n stages of fourth transmission lines;

one of the third transmission lines at a first stage is connected with two adjacent ones of the first transmission lines, and different ones of the third transmission lines at the first stage are connected with different ones of the first transmission lines; one of the third transmission lines at an $m^{th}$ stage is connected with two adjacent ones of the third transmission lines at an $(m-1)^{th}$ stage, and different ones of the third transmission lines at the $m^{th}$ stage are connected with different ones of the third transmission lines at the $(m-1)^{th}$ stage;

one of the fourth transmission lines at the first stage is connected with two adjacent ones of the second transmission lines, and different ones of the fourth transmission lines at the first stage are connected with different ones of the second transmission lines; one of the fourth transmission lines at the $m^{th}$ stage is connected with two adjacent ones of the fourth transmission lines at the $(m-1)^{th}$ stage, different ones of the fourth transmission lines at the $m^{th}$ stage are connected with different ones of the fourth transmission lines at the $(m-1)^{th}$ stage, where $n \geqslant 2$, $2 \leqslant m \leqslant n$, and both m and n are integers.

In some implementations, the first feeding unit and the second feeding unit are located on a printed circuit board.

In some implementations, the transparent antenna further includes: a first side plate and a second side plate which are opposite to each other, where the first side plate and the second side plate are respectively connected to two side edges of the first backplane which are opposite to each other in a width direction of the first backplane, a plane where the first side plate is located and a plane where the second side plate is located are intersected with a plane where the first backplane is located, the first side plate is closer to the first transmission lines and the second transmission lines than the second side plate, and the printed circuit board is fixed on a surface of the first side plate away from the second side plate.

In some implementations, the printed circuit board is fixed to the first side plate by bolting.

In some implementations, the first backpane, the first side plate, and the second side plate are in one piece.

In some implementations, the transparent antenna further includes: an antenna housing, where the first backplane, the first side plate and the second side plate are all arranged in the antenna housing and are fixed to the antenna housing.

In some implementations, the antenna housing includes a second backplane, the first backplane being fixedly connected with the second backplane.

In some implementations, the second backplane includes protruding portions and recessing portions which are alternately arranged, the protruding portions being fixed to the first backplane by bolting.

In some implementations, the first dielectric layer includes a first base material, a first fixing plate and a second base material which are stacked, a surface of the first base material away from the first fixing plate is the first surface of the first dielectric layer, a surface of the second base material away from the first fixing plate is the second surface of the first dielectric layer.

In some implementations, the first base material is fixedly connected with the first fixing plate by a first adhesive layer; the second base material is fixedly connected with the first fixing plate by a second adhesive layer.

In some implementations, a material of the first fixing plate includes polycarbonate; a material of the first base material and the second base material includes polyethylene terephthalate or polyimide.

In some implementations, the second dielectric layer includes a third base material, a second fixing plate and a fourth base material which are stacked, a surface of the third base material away from the second fixing plate is the third surface of the second dielectric layer, and a surface of the fourth base material away from the second fixing plate is the fourth surface of the second dielectric layer.

In some implementations, the third base material is fixedly connected with the second fixing plate by a third adhesive layer, and the fourth base material is fixedly connected with the second fixing plate by a fourth adhesive layer.

In some implementations, a material of the second fixing plate includes polycarbonate, a material of the third base material and the fourth base material includes polyethylene terephthalate or polyimide.

In some implementations, the third dielectric layer includes a fifth base material, a third fixing plate and a sixth base material which are stacked, a surface of the fifth base material away from the third fixing plate is the fifth surface of the third dielectric layer, and a surface of the sixth base material away from the third fixing plate is the sixth surface of the third dielectric layer.

In some implementations, the fifth base material is fixedly connected with the third fixing plate by a fifth adhesive layer, and the sixth base material is fixedly connected with the third fixing plate by a sixth adhesive layer.

In some implementations, a material of the third fixing plate includes polycarbonate, a material of the fifth base material and the sixth base material includes polyethylene terephthalate or polyimide.

In some implementations, the first balun feed structure and the second balun feed structure each include a strip-shaped balun feed structure.

In some implementations, the first balun feed structure is connected with the first transmission line by means of soldering; and/or the second balun feed structure is connected with the second transmission line by means of soldering.

In a second aspect, an embodiment of the present disclosure provides a communication system, which includes the transparent antenna described above.

In some implementations, the transparent antenna is fixed to a surface of a glass window.

In some implementations, the transparent antenna is fixed to a base station.

In some implementations, the communication system further includes:

- a transceiving unit configured to transmit or receive a signal;
- a radio frequency transceiver, which is connected with the transceiving unit and configured to modulate the signal transmitted by the transceiving unit or demodulate a signal received by the antenna and then transmit the signal to the transceiving unit;
- a signal amplifier, which is connected with the radio frequency transceiver and is configured to improve a signal-to-noise ratio of the signal output by the radio frequency transceiver or the signal received by the antenna;
- a power amplifier, which is connected with the radio frequency transceiver and is configured to amplify power of the signal output by the radio frequency transceiver or the signal received by the antenna; and
- a filtering unit, which is connected with the signal amplifier, the power amplifier and the transparent antenna, and is configured to filter the received signal and then transmit the filtered signal to the transparent antenna or filter the signal received by the antenna.

DRAWINGS

DETAILED DESCRIPTION

Figure 1:
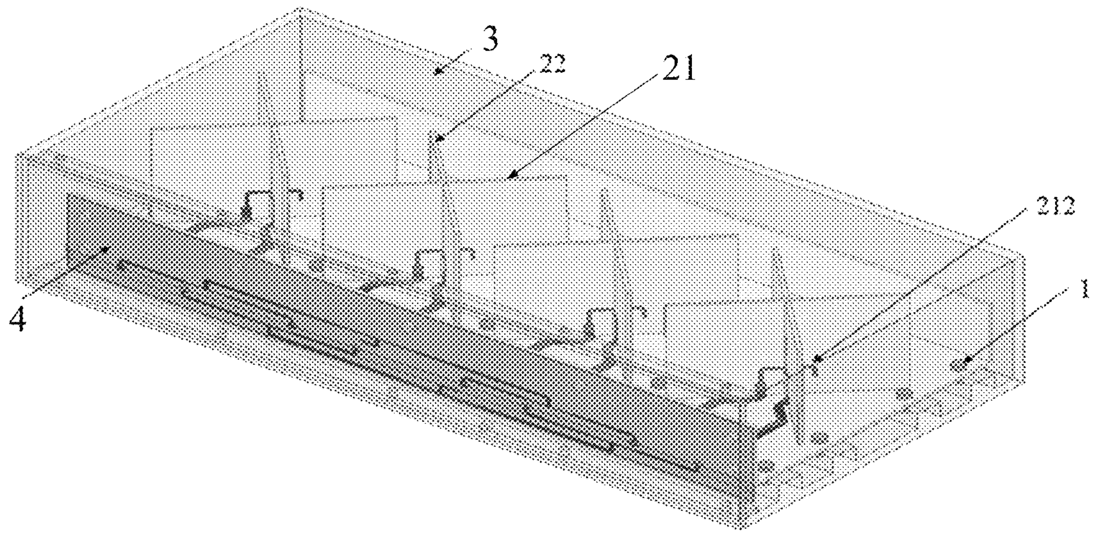
FIG. 1 is a schematic perspective view of a transparent antenna according to an embodiment of the present disclosure.

In order to make the technical solutions of the present disclosure better understood, the present disclosure is described in detail with reference to the accompanying drawings and the detailed description below.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the words "a," "an," or "the" and similar referents do not denote a limitation of quantity, but rather denote the presence of at least one. The word "comprising" or "including", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and when the absolute position of the object being described is changed, the relative positional relationships may also be changed accordingly.

The embodiments of the present disclosure are not limited to the embodiments shown in the drawings, but include modifications of configurations formed based on a manufacturing process. Thus, regions illustrated in the drawings have schematic properties, and shapes of the regions shown in the drawings illustrate specific shapes of regions of elements, but are not intended to be limiting.

Embodiments of the present disclosure provide a transparent antenna that may be used in glass window systems including, but not limited to, automobiles, trains (including high-speed rail), aircraft, buildings, or the like. The transparent antenna may be fixed to an inner side of the glass window (a side closer to the room). Since the optical transmittance of the transparent antenna is relatively high, the transparent antenna has little influence on the transmittance of the glass window while realizing the communication function, and the transparent antenna also is a trend of beautifying an antenna. The glass window in the embodiment of the present disclosure includes, but is not limited to, double glass, and the type of the glass window may also be single glass, laminated glass, thin glass, thick glass, or the like. In the embodiments of the present disclosure, the application of the glass window attached with the transparent antenna to a subway window system is taken as an example for explanation.

Figure 2:
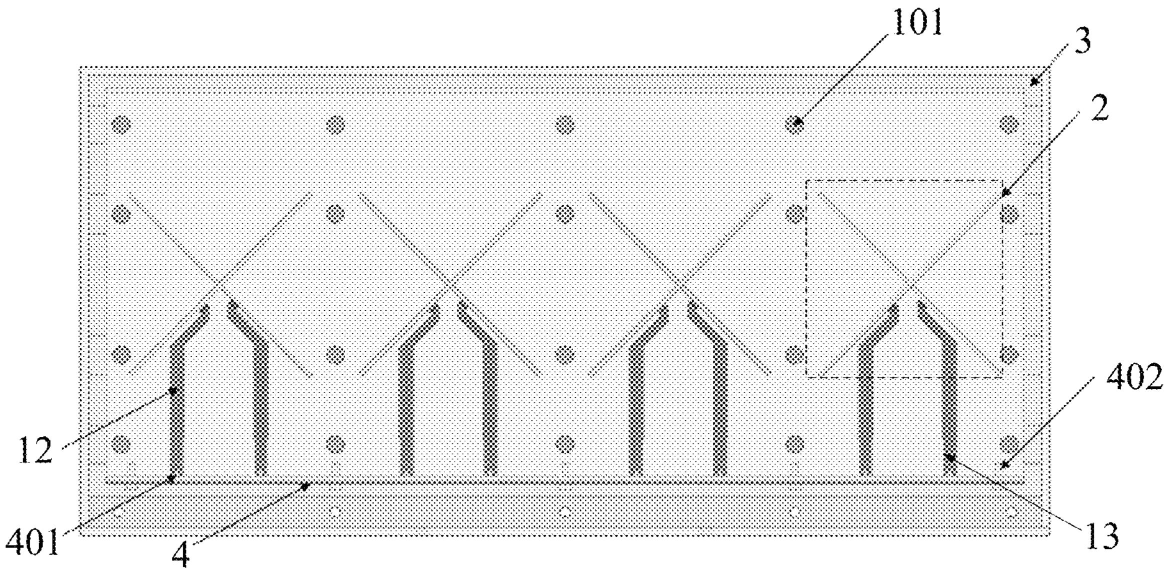
FIG. 2 is a top view of a transparent antenna according to an embodiment of the present disclosure.
Figure 3:
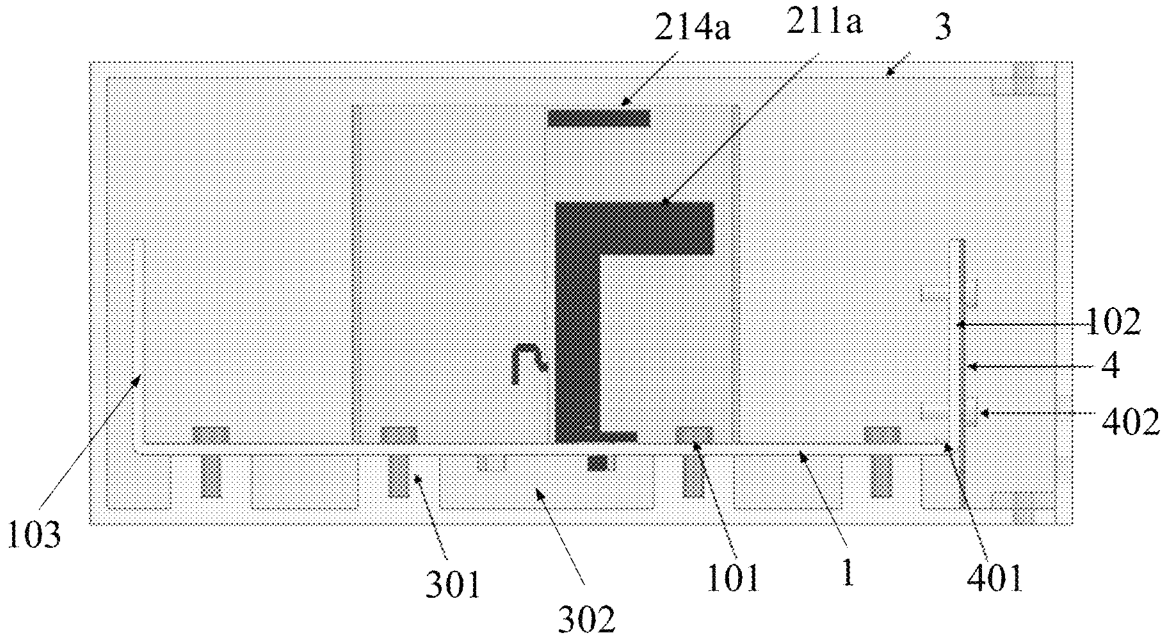
FIG. 3 is a side view of a transparent antenna according to an embodiment of the present disclosure.
Figure 4:
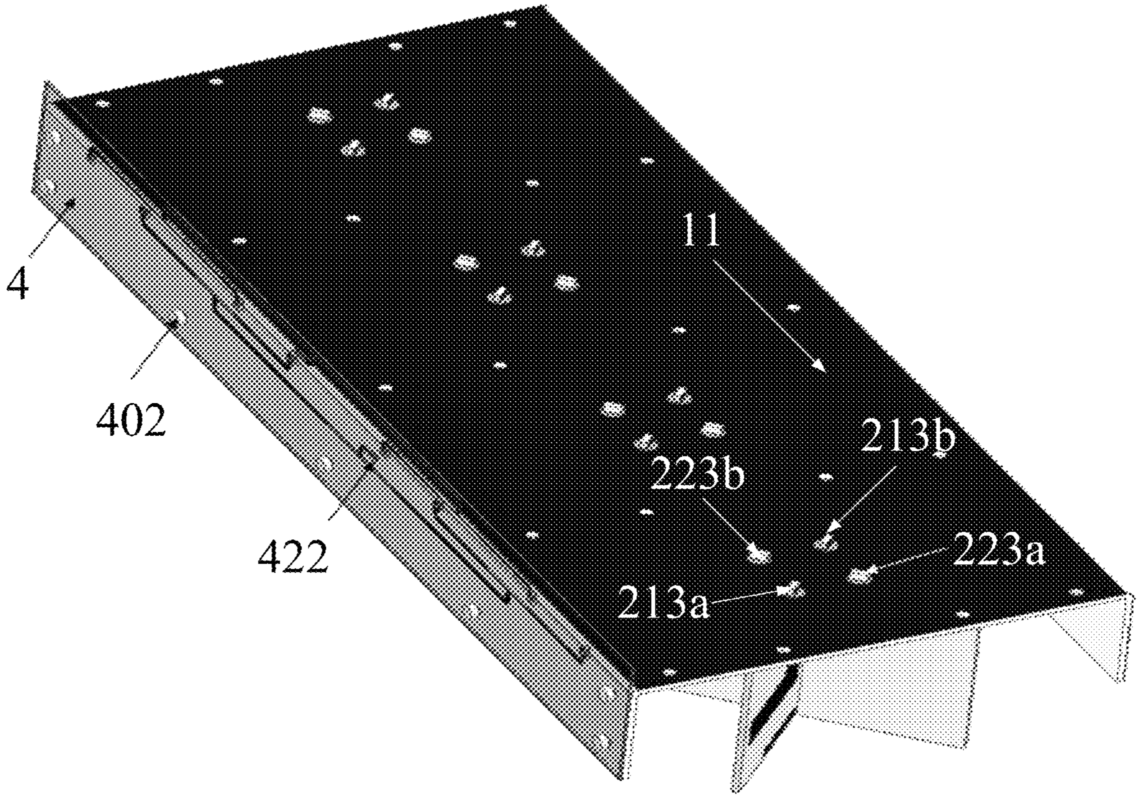
FIG. 4 is a schematic diagram of a first backplane of a transparent antenna according to an embodiment of the present disclosure.
Figure 5:
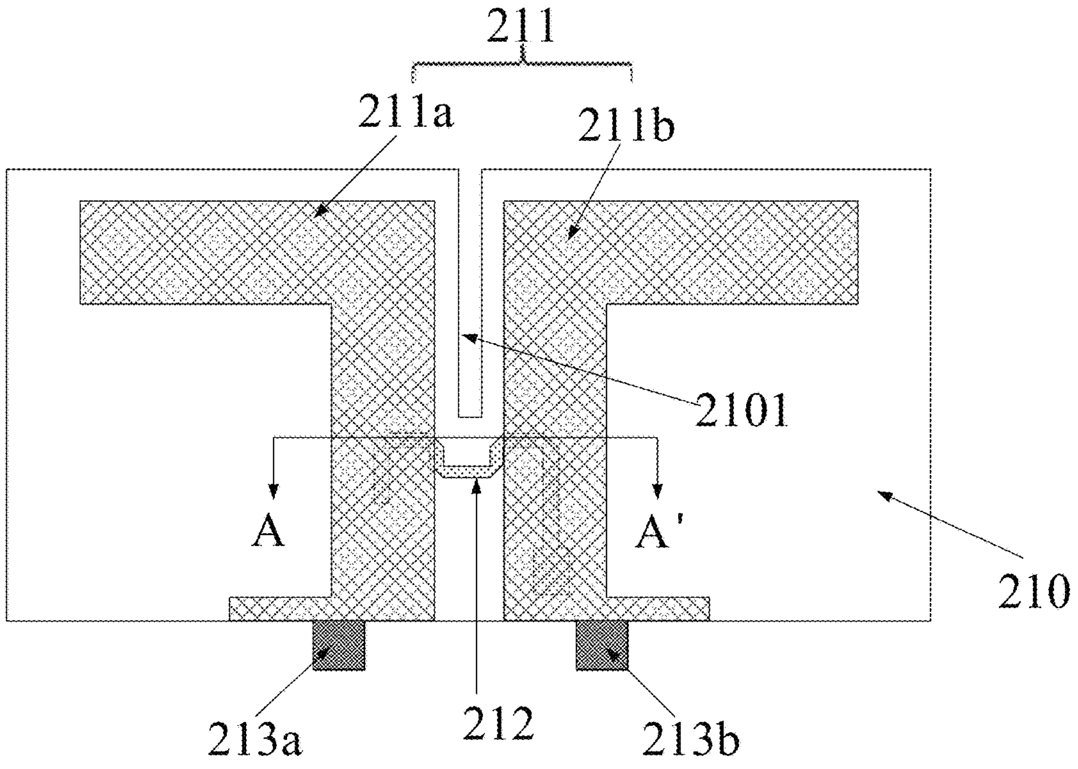
FIG. 5 is a schematic diagram of a first antenna dielectric plate according to an embodiment of the disclosure.
Figure 6:
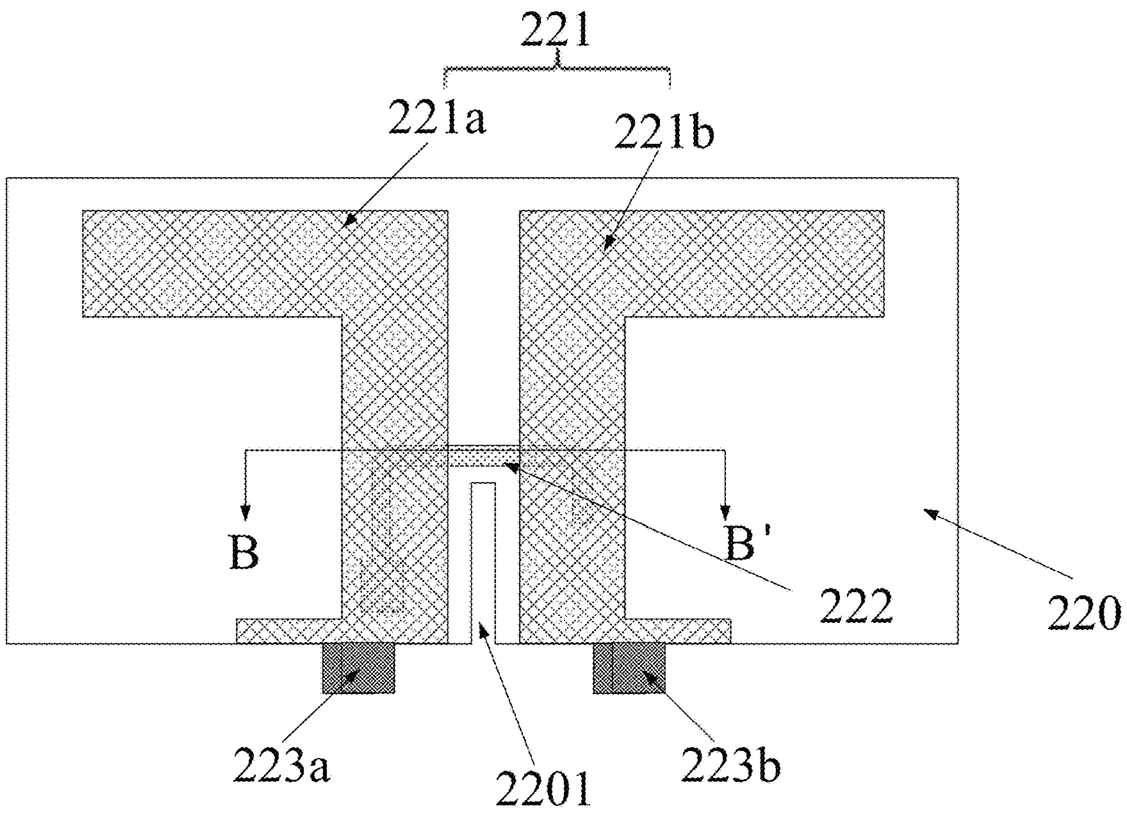
FIG. 6 is a schematic diagram of a second antenna dielectric plate according to an embodiment of the disclosure.
Figure 7:
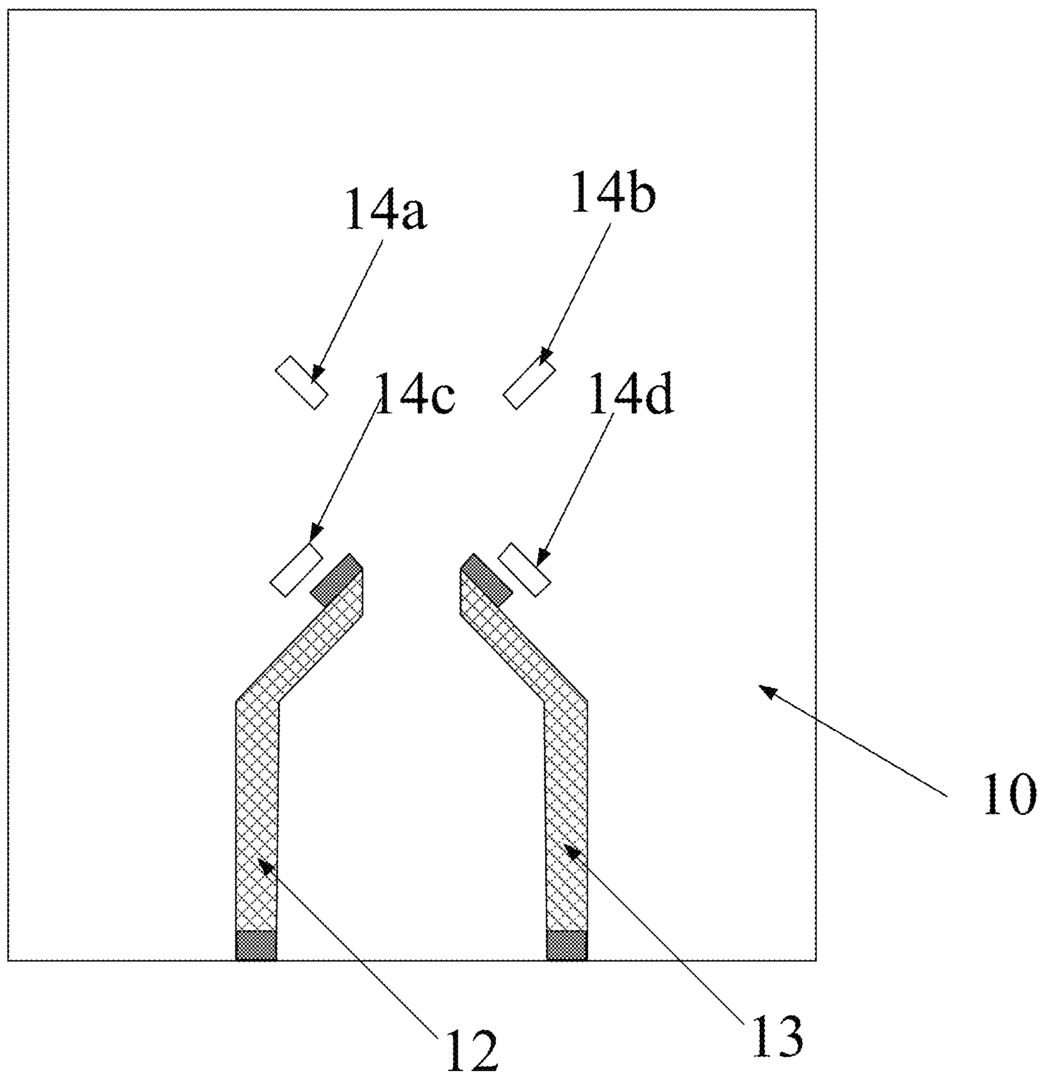
FIG. 7 is a schematic diagram illustrating a side of a first backplane where a first transmission line is located and a side of the first backplane where a second transmission line is located according to an embodiment of the present disclosure.
Figure 8:
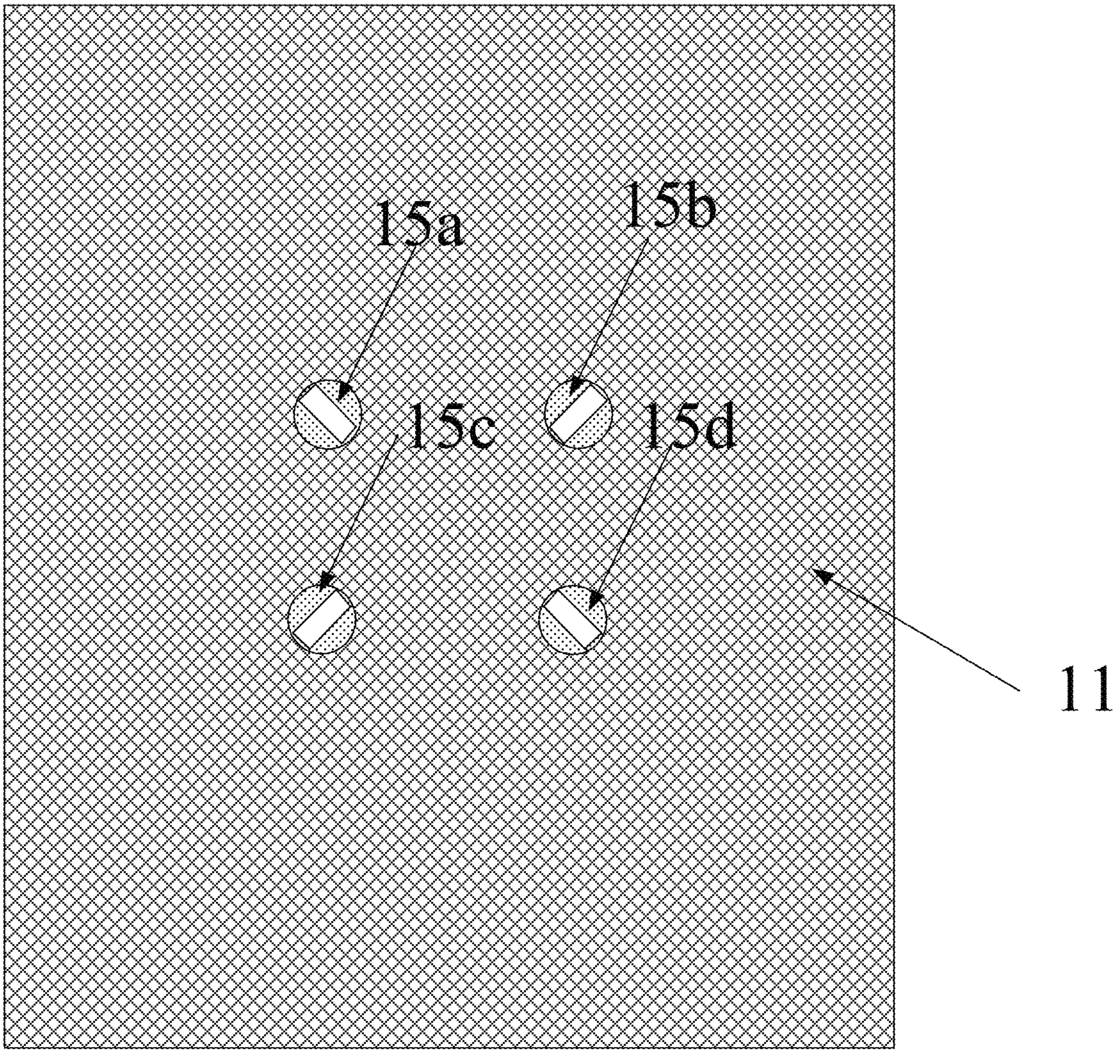
FIG. 8 is a schematic diagram illustrating a side of a first backplane where a first electrode layer is located according to an embodiment of the present disclosure.

In a first aspect, FIG. 1 is a schematic perspective view of a transparent antenna according to an embodiment of the present disclosure; FIG. 2 is a top view of a transparent antenna according to an embodiment of the present disclosure; FIG. 3 is a side view of a transparent antenna according to an embodiment of the present disclosure; FIG. 4 is a schematic diagram of a first backplane 1 of a transparent antenna according to an embodiment of the present disclosure; FIG. 5 is a schematic diagram of a first antenna dielectric plate 21 according to an embodiment of the present disclosure; FIG. 6 is a schematic diagram of a second antenna dielectric plate 22 according to an embodiment of the present disclosure; FIG. 7 is a schematic diagram illustrating a side of a first backplane 1 where a first transmission line 12 is located and a side of the first backplane 1 where a second transmission line 13 is located according to an embodiment of the present disclosure; FIG. 8 is a schematic diagram illustrating a side of a first backplane 1 where a first electrode layer 11 is located according to an embodiment of the present disclosure. As shown in FIGS. 1 to 8, an embodiment of the present disclosure provides a transparent antenna, which includes a first backplane 1 and at least one radiating structure 2, in FIG. 1, a case where a plurality of radiating structures 2 are provided is taken as an example. The first backplane 1 includes a first dielectric layer 10, a first electrode layer 11, a plurality of first transmission lines 12, and a plurality of second transmission lines 13. The first electrode layer 11 is arranged on a first surface of the first dielectric layer 10; the plurality of first transmission lines 12, the plurality of second transmission lines 13 and the radiating structures 2 are all disposed on a second surface of the first dielectric layer 10. Each of the radiating structures 2 includes a first antenna dielectric plate 21 and a second antenna dielectric plate 22 which are intersected with each other. The first antenna dielectric plate 21 includes a second dielectric layer 210, a first radiating element 211 and a first balun feed structure 212; the second dielectric layer 210 includes a third surface and a fourth surface opposite to each other; the third surface of the second dielectric layer 210 intersects the first surface of the first dielectric layer 10. The second dielectric layer 210 is fixed on the second surface of the first dielectric layer 10, the first radiating element 211 is disposed on the third surface of the second dielectric layer 210, and the first balun feed structure 212 is disposed on the fourth surface of the second dielectric layer 210. The first balun feed structure 212 is electrically connected to one of the first transmission lines 12, and the first radiating element 211 is electrically connected to the first electrode layer 11. The second antenna dielectric plate 22 includes a third dielectric layer 220, a second radiating element 221, and a second balun feed structure. The third dielectric layer 220 includes a fifth surface and a sixth surface opposite to each other, the fifth surface of the third dielectric layer 220 intersects the first surface of the first dielectric layer 10. The third dielectric layer 220 intersects the second dielectric layer 210 and is fixed on the second surface of the first dielectric layer 10. The second radiating element 221 is disposed on the fifth surface of the third dielectric layer 220, and the second balun feed structure is disposed on the sixth surface of the third dielectric layer 220. The second balun feed structure is electrically connected to one of the second transmission lines 13, and the second radiating element 221 is electrically connected to the first electrode layer 11.

It should be noted that the transparent antenna in the embodiment of the present disclosure may be a receiving antenna, a transmitting antenna, or a transceiving antenna that simultaneously transmits and receives signals. In the following description, a case where the transparent antenna is a transmitting antenna is taken an example for illustration. The first electrode layer 11 includes, but is not limited to, a ground electrode layer, and a case where the first electrode layer 11 is the ground electrode layer is taken as an example for illustration in the embodiment of the present disclosure.

In the embodiment of the present disclosure, the first surface and the second surface of the first dielectric layer 10 are parallel to each other; the third surface and the fourth surface of the second dielectric layer 210 are parallel to each other; the fifth surface and the sixth surface of the third dielectric layer 220 are parallel to each other. In FIG. 1 in the embodiment of the present disclosure, a case where a dihedral angle between the first surface of the first dielectric layer 10 and the third surface of the second dielectric layer 210 is 90°, a dihedral angle between the first surface of the first dielectric layer 10 and the fifth surface of the third dielectric layer 220 is 90°, and a dihedral angle between the third surface of the second dielectric layer 210 and the fifth surface of the third dielectric layer 220 is 90° is taken an example for illustration. In such case, the first dielectric layer 10 and the second dielectric layer 210 are disposed perpendicular to each other, the first dielectric layer 10 and the third dielectric layer 220 are disposed perpendicular to each other, and the second dielectric layer 210 and the third dielectric layer 220 are disposed perpendicular to each other. It should be understood that the case where the dihedral angle between the first surface of the first dielectric layer 10 and the third surface of the second dielectric layer 210 is 90°, the dihedral angle between the first surface of the first dielectric layer 10 and the fifth surface of the third dielectric layer 220 is 90°, and the dihedral angle between the third surface of the second dielectric layer 210 and the fifth surface of the third dielectric layer 220 is 90° does not limit the scope of the embodiments of the present disclosure.

In the embodiment of the present disclosure, since the first antenna dielectric plate 21 of each radiating structure 2 includes the first balun feed structure 212, and the second antenna dielectric plate 22 of each radiating structure 2 includes the second balun feed structure, the first balun feed structure 212 may be fed through the first transmission line 12, and then the first balun feed structure 212 is coupled with the first radiating element 211 to transmit a microwave signal through the first radiating element 211. In a similar way, the second balun feed structure may be fed through the second transmission line, and then the second balun feed structure is coupled with the second radiating element 221 to transmit a microwave signal through the second radiating element 221. The transparent antenna in the embodiment of the present disclosure can effectively improve the radiation efficiency, has a relatively high gain, and can ensure the stability of signal transmission. In addition, the transparent antenna in the embodiment of the present disclosure has the characteristics of high concealment and beauty.

Figure 9:
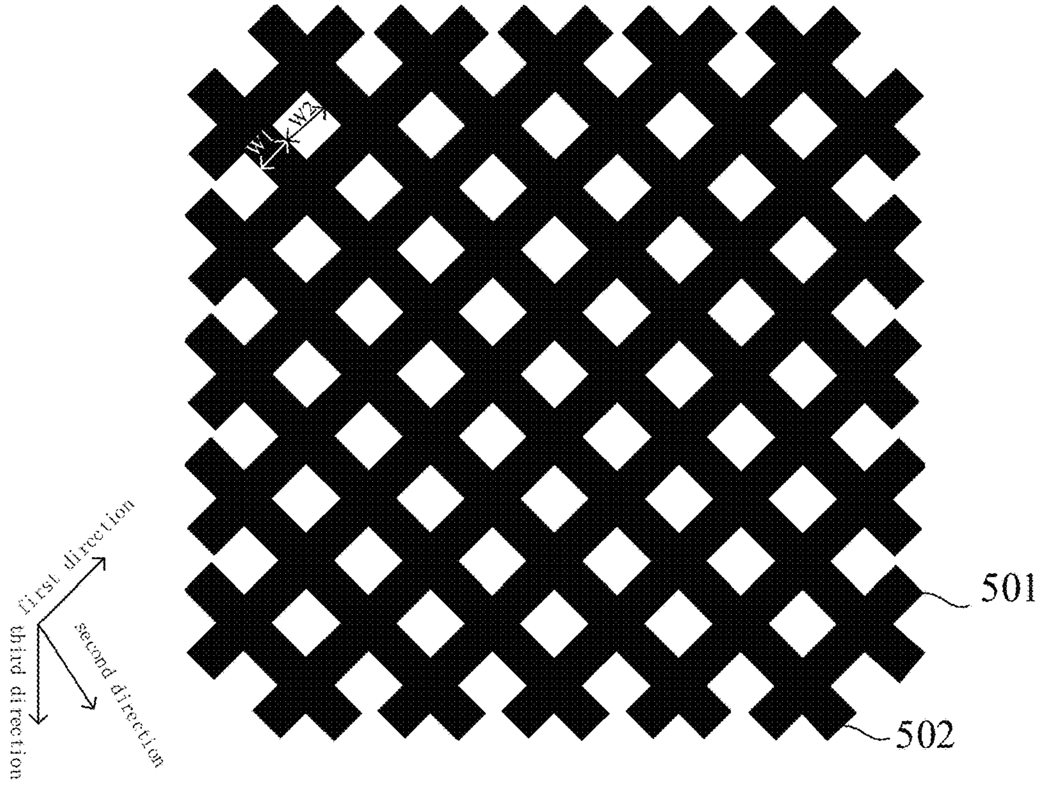
FIG. 9 is a schematic diagram of a metal mesh structure according an embodiment of the present disclosure.

In some examples, at least one of the first electrode layer 11, the first radiating element 211, the first balun feed structure 212, the second balun feed structure, the first transmission line 12, and the second transmission line 13 is of a metal mesh structure. In some implementations, the first electrode layer 11, the first radiating element 211, the first balun feed structure 212, the second balun feed structure, the first transmission line 12 and the second transmission line 13 all adopt the metal mesh structure. By this way, the optical transmittance of the transparent antenna can be further improved. FIG. 9 is a schematic diagram of a metal mesh structure according to an embodiment of the present disclosure, as shown in FIG. 9, in some examples, the metal mesh structure may include a plurality of first metal lines 501 and a plurality of second metal lines 502 which are intersected with each other. The first metal lines 501 are arranged side by side along a first direction and each extend along a second direction; the second metal lines 502 are arranged side by side along the second direction and each extend along a third direction. For example, in the metal mesh structure, an extending direction in which the first metal lines 501 each extends may be perpendicular to an extending direction in which the second metal lines 502 each extends, in such case, square or rectangular hollow-out portions are formed. Certainly, in the metal mesh structure, the extending direction of each of the first metal lines 501 may be not perpendicular to the extending direction of each of the second metal lines 502, for example, an included angle between the extending directions of the first metal line 501 and the second metal line 502 is 45°, and in such case, diamond-shaped hollow-out portions are formed. Ends of the first metal lines 501 and the second metal lines 502 of the metal mesh structure are connected together, that is, the metal mesh structure has a closed loop structure at a periphery thereof. In an actual product, the ends of the first metal lines 501 and the second metal lines 502 of the metal mesh structure may not be connected to each other, that is, the metal mesh structure is radial at the periphery thereof. In the embodiment of the present disclosure, the light transmittance of the transparent antenna adopting the metal mesh structure can reach about 70% to 88%.

Furthermore, an orthographic projection, of the hollow-out portions of the first electrode layer 11 in the metal mesh structure on the first surface of the first dielectric layer 10, on the first dielectric layer 10 is completely overlapped with an orthographic projection, of the hollow-out portions of the first transmission line 12 and the second transmission line 13 in the metal mesh structure on the second surface of the first dielectric layer 10, on the first dielectric layer 10. An orthographic projection, of the hollow-out portions of the first balun feed structure 212 in the metal mesh structure on the third surface of the second dielectric layer 210, on the second dielectric layer 210 is completely overlapped with an orthographic projection, of the hollowed-out portions of the first balun feed structure 212 in the metal mesh structure on the fourth surface of the second dielectric layer 210, on the second dielectric layer 210. An orthographic projection, of the hollowed-out portions of the second balun feed structure 222 in the metal mesh structure on the fifth surface of the third dielectric layer 220, on the third dielectric layer 220 is completely overlapped with an orthographic projection, of the hollowed-out portions of the second balun feed structure in the metal mesh structure on the sixth surface of the third dielectric layer 220, on the third dielectric layer 220. In such case, the light transmittance of the transparent antenna can be further improved.

In some examples, in the metal mesh structure, the first metal lines 501 and the second metal lines 502 each have a same line width and a same line thickness, and a spacing between any two adjacent first metal lines 501 or any two adjacent second metal lines 502 may be constant, but may also be variable. For example, each of the first metal lines 501 and the second metal lines 502 has a line width W1 ranging from about 11 μm to about 30 μm and a line thickness ranging from about 0.5 μm to about 10 μm, and a spacing W2 between any two adjacent first metal lines 501 or between any two second metal lines 502 is in a range from about 50 μm to about 250 μm.

Figure 10:
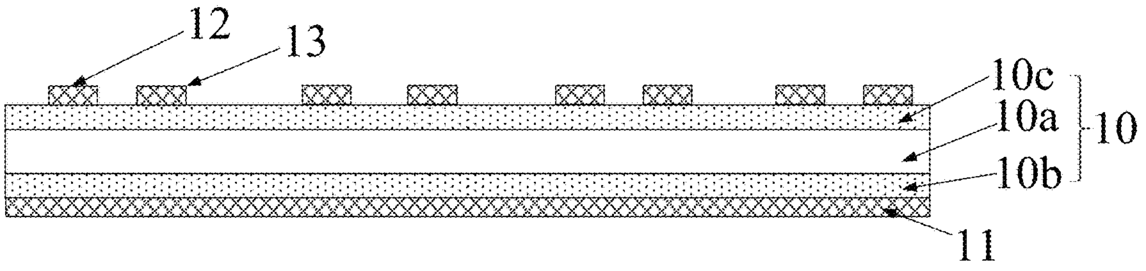
FIG. 10 is a cross-sectional view of a first backplane according to an embodiment of the present disclosure.

FIG. 10 is a cross-sectional view of the first backplane 1 according to an embodiment of the present disclosure; as shown in FIG. 10, in some examples, the first dielectric layer 10 of the first backplane 1 may include a first base material 10*b*, a first fixing plate 10*a*, and a second base material 10*c*, which are sequentially stacked. A surface of the first base material 10*b* away from the first fixing plate 10*a* is a first surface of the first backplane 1; a surface of the second base material 10*c* away from the first fixing plate 10*a* is a second surface of the first backplane 1. The first base material 10*b* may be fixedly connected with the first fixing plate 10*a* through a first adhesive layer; the second base material 10*c* may be fixedly connected with the first fixing plate 10*a* through a second adhesive layer. That is, the first electrode layer 11 is disposed on a side of the first base material 10*b* away from the first fixing plate 10*a*, and the first transmission lines 12 and the second transmission lines 13 are disposed on a side of the second base material 10*c* away from the first fixing plate 10*a*.

Materials of the first base material 10*b* and the second base material 10*c* may be the same or different; for example, the first base material 10*b* and the second base material 10*c* are flexible films made of a material including, but not limited to, Polyethylene Terephthalate (PET), Polyimide (PI), or the like. In the embodiment of the present disclosure, both the first base material 10*b* and the second base material 10*c* being made of PET is taken as an example for illustration. The first base material 10*b* and the second base material 10*c* each have a thickness ranging from about 50 μm to about 250 μm. Since the first base material 10*b* and the second base material 10*c* are flexible and thus cannot provide good support for the first electrode layer 11, the first transmission lines 12 and the second transmission lines 13, therefore, the first electrode layer 11, the first transmission lines 12 and the second transmission lines 13 are easily deformed, and a desired radiation effect cannot be obtained. Therefore, the first fixing plate 10*a* is provided to maintain rigidity of the first backplane 1, and a material of the first fixing plate 10*a* includes, but is not limited to, Polycarbonate (PC), Copolymers of Cycloolefin (COP) or acrylic/Polymethyl Methacrylate (PMMA). A thickness of the first fixing plate 10*a* ranges from about 1 mm to about 3 mm. Materials of the first adhesive layer and the second adhesive layer may be the same or different, for example, both the first adhesive layer and the second adhesive layer are made of transparent optical adhesive (OCA).

Figure 11:
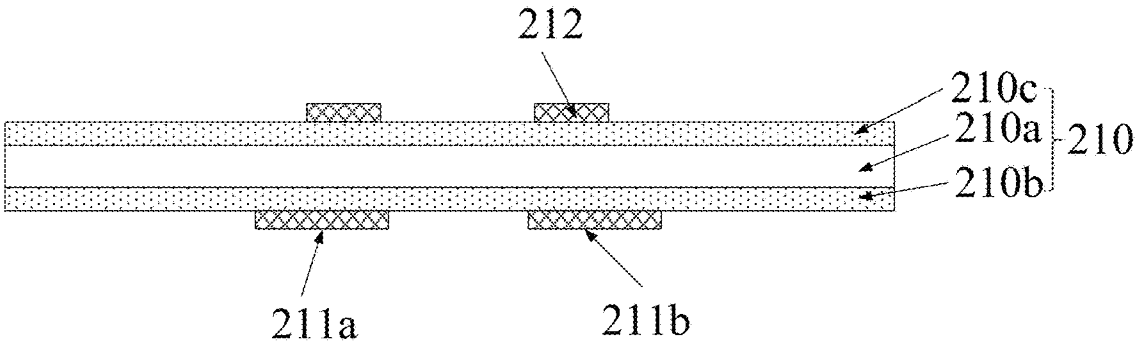
FIG. 11 is a cross-sectional view taken along a line A-A' of FIG. 5.

FIG. 11 is a cross-sectional view taken along a line A-A' of FIG. 5, as shown in FIG. 11, in some examples, the second dielectric layer 210 of the first antenna dielectric plate 21 includes a third base material 210*b*, a second fixing plate 210*a*, and a fourth base material 210*c*, which are stacked. A surface of the third base material 210*b* away from the second fixing plate 210*a* is the third surface of the second dielectric layer 210. A surface of the fourth base material 210*c* away from the second fixing plate 210*a* is the fourth surface of the second dielectric layer 210. The third base material 210*b* may be fixedly connected to the second fixing plate 210*a* through a third adhesive layer, and the fourth base material 210*c* may be fixedly connected to the second fixing plate 210*a* through a fourth adhesive layer. That is, the first radiating element 211 is disposed on a side of the third base material 210*b* away from the second fixing plate 210*a*, and the first balun feed structure 212 is disposed on a side of the fourth base material 210*c* away from the second fixing plate 210*a*.

Materials of the third base material 210*b* and the fourth base material 210*c* may be the same as the material of the first base material 10*b*, materials of the third adhesive layer and the fourth adhesive layer may be the same as the material of the first adhesive layer, and a material of the second fixing plate 210*a* may be the same as the material of the first fixing plate 10*a*, thus the description thereof is not repeated herein.

Figure 12:
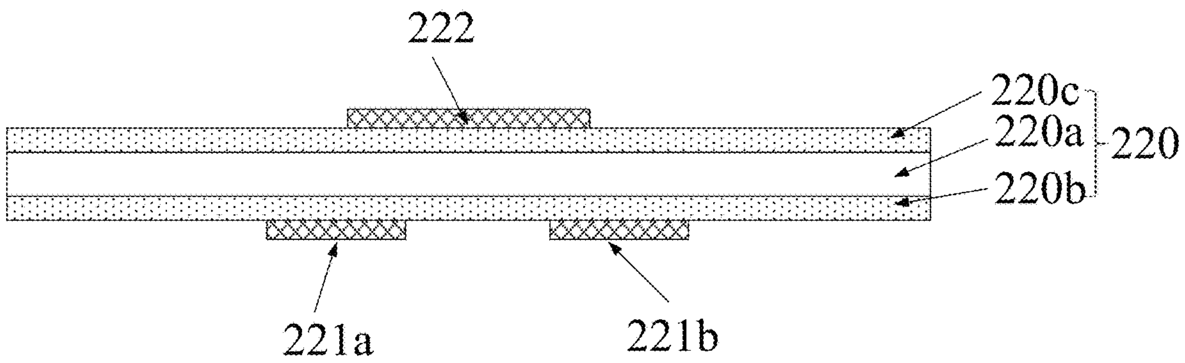
FIG. 12 is a cross-sectional view taken along a line B-B' of FIG. 6.

FIG. 12 is a cross-sectional view taken along a line B-B' of FIG. 6, as shown in FIG. 12, in some examples, the third dielectric layer 220 of the second antenna dielectric plate 22 includes a fifth base material 220*b*, a third fixing plate 220*a* and a sixth base material 220*c* which are stacked. A surface of the fifth base material 220*b* away from the third fixing plate 220*a* is the fifth surface of the third dielectric layer 220, and a surface of the sixth base material 220*c* away from the third fixing plate 220*a* is the sixth surface of the third dielectric layer 220. The fifth base material 220*b* may be fixedly connected to the third fixing plate 220*a* through a fifth adhesive layer, and the sixth base material 220*c* may be fixedly connected to the third fixing plate 220*a* through a sixth adhesive layer. That is, the second radiating element 221 is disposed on a side of the fifth base material 220*b* away from the third fixing plate 220*a*, and the second balun feed structure is disposed on a side of the sixth base material 220*c* away from the third fixing plate 220*a*.

Materials of the fifth base material 220*b* and the sixth base material 220*c* may be the same as the material of the first base material 10*b*, materials of the fifth adhesive layer and the sixth adhesive layer may be the same as the material of the first adhesive layer, and a material of the third fixing plate 220*a* may be the same as the material of the first fixing plate 10*a*, and the description thereof is not repeated herein.

In some examples, with continued reference to FIGS. 5 to 8, the second dielectric layer 210 of the first antenna dielectric plate 21 includes a first side edge and a second side edge that are oppositely disposed, the third dielectric layer 220 of the second antenna dielectric plate 22 includes a third side edge and a fourth side edge that are oppositely disposed. The first side edge of the second dielectric layer 210 and the third side edge of the third dielectric layer 220 are both fixed on the first dielectric layer 10 of the first backplane 1. A first slot 2101 is provided in the first side edge of the second dielectric layer 210, a second slot 2201 is provided in the fourth side edge of the third dielectric layer 220, and the second dielectric layer 210 and the third dielectric layer 220 are inserted into each other through the first slot 2101 and the second slot 2201. Certainly, it is feasible for the first slot 2101 to be provided in the second side edge of the second dielectric layer 210, and the second slot to be provided in the third side edge of the third dielectric layer 220, and the second dielectric layer 210 and the third dielectric layer 220 are inserted into each other through the first slot 2101 and the second slot 2201.

With continued reference to FIGS. 5 to 6, a central axis of the first slot 2101 along its depth direction passes through a center of the second dielectric layer 210, and a central axis of the second slot along its depth direction passes through a center of the third dielectric layer 220. The second side edge of the second dielectric layer 210 and the fourth side edge of the third dielectric layer 220 are coplanar. In such way, a size of the transparent antenna can be reduced.

With reference to FIGS. 5 to 6, the first radiating element 211 is mirror-symmetrical with respect to the central axis of the first slot 2101 in the depth direction of the first slot; the second radiating element 221 is mirror-symmetrical with the respect to the central axis of the second slot in the depth direction of the second slot. For example, the first radiating element 211 and the second radiating element 221 are both T-shaped dipole oscillators. In the embodiment of the present disclosure, the first radiating element 211 and the second radiating element 221 being both T-shaped dipole oscillators is taken as an example for illustration, that is, the first radiating element 211 includes a first dipole arm 211*a* and a second dipole arm 211*b*, and the second radiating element 221 includes a third dipole arm 221*a* and a fourth dipole arm 221*b*.

Figure 13:
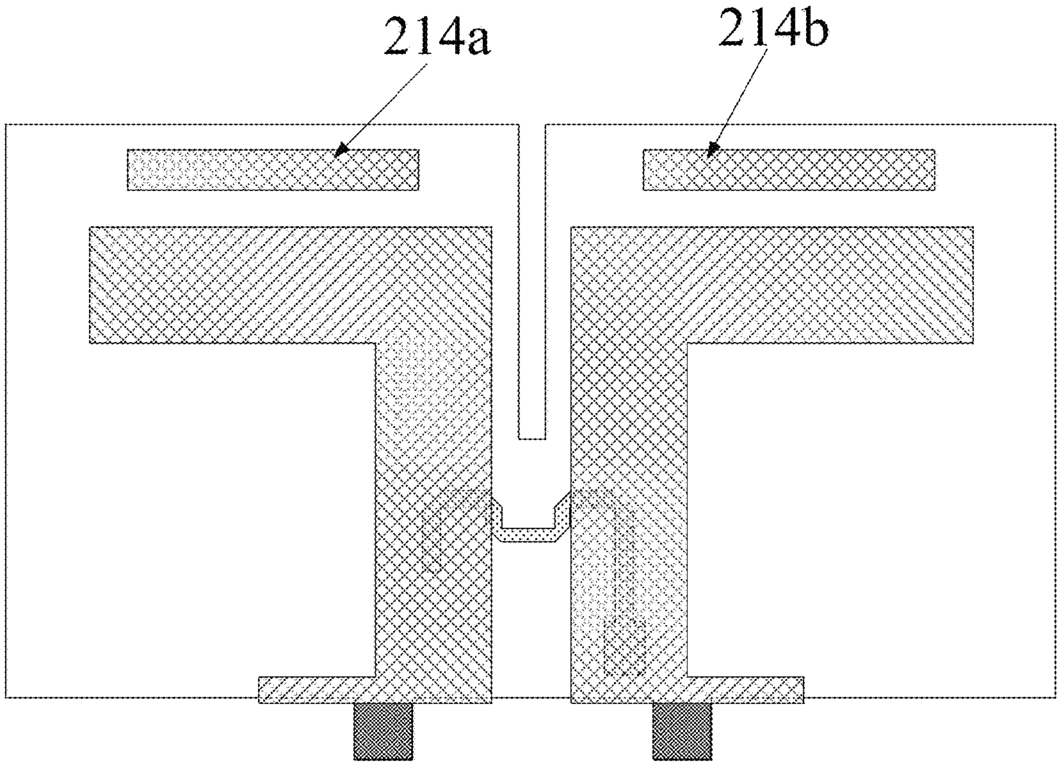
FIG. 13 is a schematic diagram of another first antenna dielectric plate according to an embodiment of the present disclosure.
Figure 14:
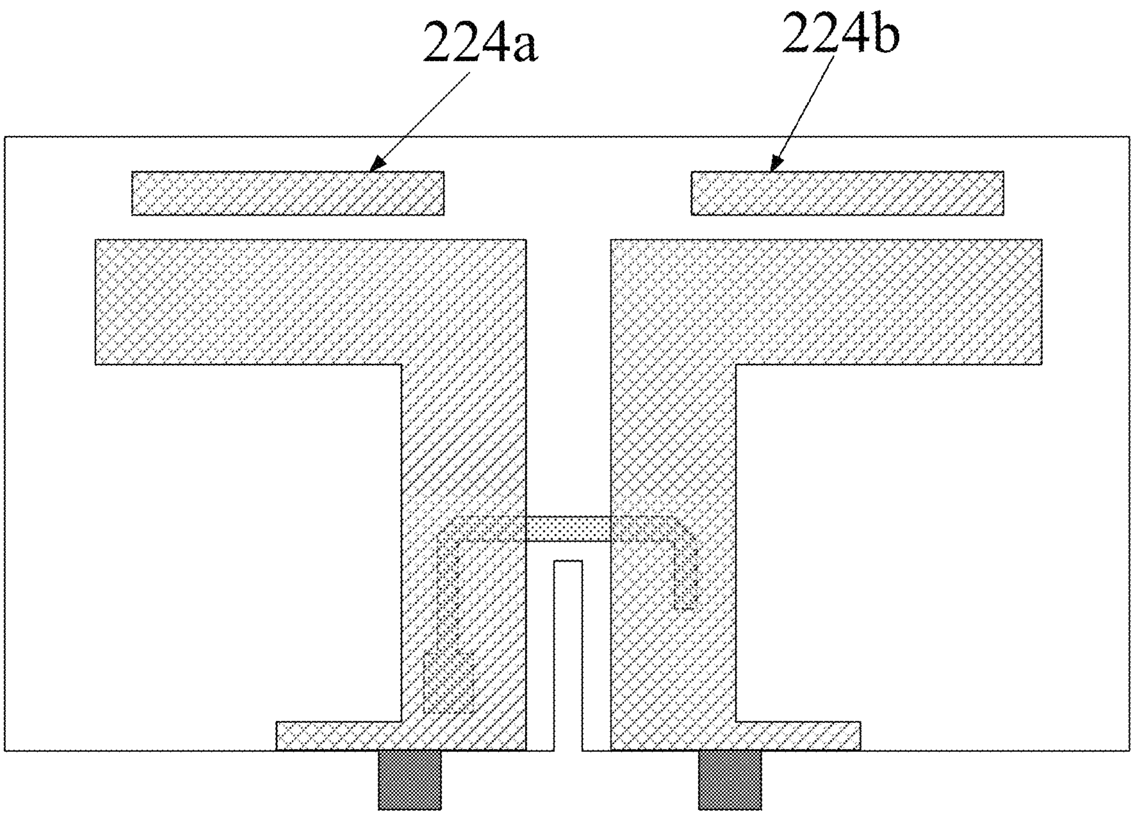
FIG. 14 is a schematic diagram of another second antenna dielectric plate according to an embodiment of the present disclosure.

FIG. 13 shows another first antenna dielectric plate 21 in an embodiment of the present disclosure; FIG. 14 shows another second antenna dielectric plate 22 in an embodiment of the present disclosure, as shown in FIGS. 13 and 14, in some examples, in addition to that the first radiating element 211 includes the first dipole arm 211*a* and the second dipole arm 211*b* shown in FIG. 5 and the second radiating element 221 includes the third dipole arm 221*a* and the fourth dipole arm 221*b* shown in FIG. 6, the first antenna dielectric plate 21 further includes a first director 214*a* and a second director 214*b*, and the second antenna dielectric plate 22 further includes a third director 224*a* and a fourth director 224*b*. The first director 214*a* and the second director 214*b* are both located on the third surface of the second dielectric layer 210, and the first director 214*a* is located on a side of the first dipole arm 211*a* away from the first backplane 1, and the second director 214*b* is located on a side of the second dipole arm 211*b* away from the first backplane 1. The third director 224*a* and the fourth director 224*b* are both located on the fifth surface of the third dielectric layer 220, and the third director 224*a* is located on a side of the third dipole arm 221*a* away from the first backplane 1, and the fourth director 224*b* is located on a side of the fourth dipole arm 221*b* away from the first backplane 1. As shown in FIGS. 13 and 14, the first director 214*a*, the second director 214*b*, the third director 224*a* and the fourth director 224*b* each take a shape of a Chinese character "—". . The gain of the transparent antenna can be effectively improved by arranging the directors in the shape of the Chinese character "—". . In the embodiment of the present disclosure, the directors in the shape of the Chinese character " ·" may also adopt a metal mesh structure, and parameters of the metal mesh structure, such as line width, line thickness, spacing between lines, etc., may be the same as those of the metal mesh structure described above, and thus, are not described herein again.

In some examples, as shown in FIGS. 4 to 8 and 13 to 14, the first side edge of the second dielectric layer 210 is provided with a first connection portion 213*a* and a second connection portion 213*b*, the third side edge of the third dielectric layer 220 is provided with a third connection portion 223*a* and a fourth connection portion 223*b*. The first dielectric layer 10 has a first through hole a, a second through hole b, a third through hole c, and a fourth through hole d therein. The first connection portion 213*a* is fixedly connected to the first through hole a, and the second connection portion 213*b* is fixedly connected with the second through hole b, so that the second dielectric layer 210 is fixedly connected to the first dielectric layer 10. The third connection portion 223*a* is fixedly connected with the third through hole c, and the fourth connection portion 223*b* is fixedly connected with the fourth through hole d, so that the third dielectric layer 220 is fixedly connected to the first dielectric layer 10.

Furthermore, a first conductive portion is provided on the first connection portion 213*a*, and the first conductive portion is electrically connected to the first dipole arm 211*a*. A second conductive portion is provided on the second connection portion 213*b*, and the second conductive portion is electrically connected to the second dipole arm 211*b*. A third conductive portion is provided on the third connection part 223*a*, and the third conductive portion is electrically connected to the third dipole arm 221*a*. A fourth conductive portion is provided on the fourth connection part 223*b*, and the fourth conductive portion is electrically connected to the fourth dipole arm 221*b*. The first electrode layer 11 is provided with a first connection pad 15*a* corresponding to the first through hole 14*a*, a second connection pad 15*b* corresponding to the second through hole 14*b*, a third connection pad 15*c* corresponding to the third through hole 14*c*, and a fourth connection pad 15*d* corresponding to the fourth through hole 14*d*. In such case, the first conductive portion is electrically connected to the first connection pad 15*a*, for example, the first conductive portion is soldered to the first connection pad 15*a*, so that the first dipole arm 211*a* is electrically connected to the first electrode layer 11 through the first conductive portion and the first connection pad 15*a*. The second conductive portion is electrically connected to the second connection pad 15*b*, for example, the second conductive portion is soldered to the second connection pad 15*b*, so that the second dipole arm 211*b* is electrically connected to the first electrode layer 11 through the second conductive portion and the second connection pad 15*b*. The third conductive portion is electrically connected to the third connection pad 15*c*, for example, the third conductive portion is soldered to the third connection pad 15*c*, so that the third dipole arm 221*a* is electrically connected to the first electrode layer 11 through the third conductive portion and the third connection pad 15*c*. The fourth conductive portion is electrically connected to the fourth connection pad 15*d*, for example, the fourth conductive portion is soldered to the fourth connection pad 15*d*, so that the fourth dipole arm 221*b* is electrically connected to the first electrode layer 11 through the fourth conductive portion and the fourth connection pad 15*d*.

In some examples, the first antenna dielectric plate 21 in the embodiment of the present disclosure includes a first metal layer disposed on the third surface of the second dielectric layer 210, the first metal layer includes the first radiating element 211, the first director 214*a*, and the second director 214*b*. That is, the first radiating element 211, the first director 214*a*, and the second director 214*b* are disposed in a same layer and made of a same material. In such case, patterns of the first radiating element 211, the first director 214*a*, and the second director 214*b* may be formed by a process including, but not limited to, imprinting or etching. Meanwhile, the second antenna dielectric plate 22 includes a second metal layer disposed on the fifth surface of the third dielectric layer 220, the second metal layer includes the second radiating element 221, the third director 224*a*, and the fourth director 224*b*. That is, the second radiating element 221, the third director 224*a*, and the fourth director 224*b* are disposed in a same layer and made of a same material. In such case, patterns of the second radiating element 221, the third director 224*a*, and the fourth director 224*b* may be formed by a process including, but not limited to, imprinting or etching.

In some examples, the first balun feed structure 212 in the first antenna dielectric plate 21 and the second balun feed structure in the second antenna dielectric plate 22 each may adopt a strip-shaped balun feed structure. In some implementations, the first balun feed structure 212 and the second balun feed structure each are provided with at least one bending structure, so as to increase areas of orthographic projections of the first balun feed structure 212 and the first radiating element 211 on the second dielectric layer 210, and areas of orthographic projections of the second balun feed structure and the second radiating element 221 on the third dielectric layer 220, thereby improving feed effect of the first balun feed structure 212 and the second balun feed structure.

In some examples, the first balun feed structure 212 is connected to the first transmission line 12 by means of soldering; and/or the second balun feed structure is connected to the second transmission line 13 by means of soldering. The case where the first balun feed structure 212 being connected to the first transmission line 12 by means of soldering, and the second balun feed structure being connected to the second transmission line 13 by means of soldering is taken as an example for illustration. By means of soldering, good electrical connection between the first balun feed structure 212 and the first transmission line 12 can be effectively ensured, and good electrical connection between the second balun feed structure and the second transmission line 13 can also be effectively ensured.

Figure 15:
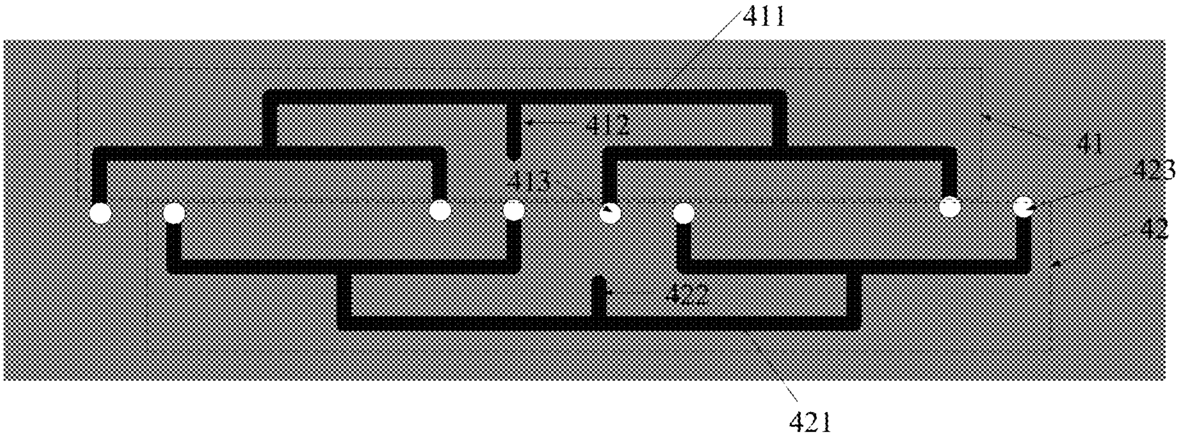
FIG. 15 is a schematic diagram of a feeding structure of a transparent antenna according to an embodiment of the present disclosure.

FIG. 15 is a schematic diagram of a feeding structure of a transparent antenna in an embodiment of the present disclosure, as shown in FIG. 15, in some examples, the transparent antenna includes not only the above-described structures but also a feeding structure, that is, a first feeding unit 41 and a second feeding unit 42; the first feeding unit 41 and the second feeding unit 42 each include one first feeding port and at least one second feeding port. One second feeding port 413 of the first feeding unit 41 is connected with the first transmission line 12; one second feeding port 422 of the second feeding unit 42 is connected to the second transmission line 13. For example, the second feeding port 413 of the first feeding unit 41 is electrically connected to the first transmission line 12 by means of soldering, and the microwave signal inputted through the first feeding port 412 of the first feeding unit 41 is transmitted to the first transmission line 12 through the second feeding port 413 of the first feeding unit 41. The second feeding port 423 of the second feeding unit 42 is electrically connected to the second transmission line 13 by means of soldering, and the microwave signal inputted through the first feeding port 422 of the second feeding unit 42 is transmitted to the second transmission line 13 through the second feeding port 423 of the second feeding unit 42.

In an example, a plurality of radiating structures 2 are provided and the number of the radiating structures 2 in the transparent antenna is $2^n$, and accordingly, a plurality of first transmission lines 12 and a plurality of second transmission lines 13 are provided, and the number of the first transmission lines 12 and the number of the second transmission lines 13 each are $2^n$. The first feeding unit 41 includes n stages of third transmission lines 411, and the second feeding unit 42 includes n stages of fourth transmission lines 421. One of the third transmission lines 411 at a first stage is connected with two adjacent first transmission lines 12, and different third transmission lines 411 at the first stage are connected to different first transmission lines 12. One of the third transmission lines 411 at an $m^{th}$ stage is connected with two adjacent third transmission lines 411 at an $(m-1)^{th}$ stage, and different third transmission lines 411 at the $m^{th}$ stage are connected with different third transmission lines 411 at the $(m-1)^{th}$ stage. One of the fourth transmission lines 421 at the first stage is connected to two adjacent second transmission lines 13, and the second transmission lines 13 connected to different fourth transmission lines 421 at the first stage are different. One of the fourth transmission lines 421 at the $m^{th}$ stage is connected two adjacent fourth transmission lines 421 at the $(m-1)^{th}$ stage, and different fourth transmission lines 421 at the $m^{th}$ stage are connected with different fourth transmission lines 421 at the $(m-1)^{th}$ stage, where $n \geq 2$, $2 \leqslant m \leqslant n$, and both m and n are integers.

For example, in FIG. 1, n=2, i.e., the transparent antenna includes four radiating structures 2, four first transmission lines 12 and four second transmission lines 13. The first feeding unit 41 includes three third transmission lines 411 at two stages, and the second feeding unit 42 includes three fourth transmission lines 421 at two stages. One of the third transmission lines 411 at the first stage is connected with feeding ends of the first and second first transmission lines 12 from left to right, and another one of the third transmission lines 411 is connected with feeding ends of the third and fourth first transmission lines 12 from left to right, and the third transmission line 411 at the second stage is connected to feeding ends of two third transmission lines 411 at the first stage. Similarly, one of the fourth transmission lines 421 at the first stage is connected to feeding ends of the first and second transmission lines 13 from left to right, and another one of the fourth transmission lines 421 is connected with feeding ends of the third and fourth second transmission lines 13 from left to right, and the fourth transmission line 421 at the second stage is connected with feeding ends of two fourth transmission lines 421 at the first stage. In such case, the feeding end of the third transmission line 411 at the second stage in the first feeding unit 41 (i.e., the first feeding port 412 of the first feeding unit 41) corresponds to +45° polarization, and the feeding end of the fourth transmission line 421 at the second stage in the second feeding unit 42 (i.e., the first feeding port 422 of the second feeding unit 42) corresponds to −45° polarization.

In some examples, the above-described first and second feeding units 41 and 42 are formed on a printed circuit board 4. The transparent antenna not only includes the above-described structures, but also includes a first side plate 102 and a second side plate 103 which are oppositely arranged, where the first side plate 102 and the second side plate 103 are respectively connected to two side edges of the first backplane 1 which are oppositely arranged in a width direction of the first backplane 1; a plane where the first side plate 102 is located and a plane where the second side plate 103 is located intersect with a plane where the first backplane 1 is located, and the first side plate 102 is closer to the first transmission lines 12 and the second transmission lines 13 than the second side plate 103. The printed circuit board 4 is fixed on a surface of the first side plate 102 away from the second side plate 103. The printed circuit board 4 is fixed to the first side plate 102 by bolting, that is, threaded holes may be formed in the printed circuit board 4 and the first side plate 102, and bolts 402 pass through the threaded holes and are tight with nuts, so that the printed circuit board 4 and the first side plate 102 are fixedly connected.

It should be noted that, since the printed circuit board 4 is fixed on the surface of the first side plate 102 away from the second side plate 103, in such case, through holes penetrating through the first side plate 102 are formed at positions corresponding to the second feeding port 413 of the first feeding unit 41 and the second feeding port 423 of the second feeding unit 42, so that the second feeding port 413 of the first feeding unit 41 can be electrically connected to the first transmission line 12 through the through hole of the first side plate 102 by using a connection component 401, and similarly, the second feeding port 423 of the second feeding unit 42 can be electrically connected to the second transmission line 13 through the through hole of the first side plate 102 by using a connection component 401. The connection component 401 includes, but is not limited to, a copper pillar.

In some examples, the first backplane 1, the first side plate 102, and the second side plate 103 may be in one piece. In such case, the first backplane 1, the first side plate and the second side plate may be formed by means of thermoforming. Certainly, the first side plate 102 and the second side plate 103 may also be fixed to the first backplane 1 by bolting.

In some examples, with continued reference to FIGS. 1 to 3, the transparent antenna includes not only the above-described structures, but also an antenna housing 3. The first backplane 1, the first side plate 102 and the second side plate 103 are all disposed in the antenna housing 3 and fixed to the antenna housing 3. The antenna housing 3 includes a second backplane, and the first backplane 1 is fixedly connected to the second backplane. The second backplane includes protruding portions 302 and recessing portions 301 which are alternately arranged, and the protruding portions 302 are fixed to the first backplane 1 by bolting. That is, threaded holes are formed in the first backplane 1 and the protruding portions 302 of the second backplane, and bolts 101 pass through the threaded holes in the first backplane 1 and the protruding portions 302 of the second backplane and are fixed with nuts, so as to fixedly connect the first backplane 1 with the second backplane.

A material of the antenna housing 3 includes, but is not limited to, Polycarbonate (PC), Copolymers of Cycloolefin (COP), or Acrylic/Polymethyl Methacrylate (PMMA).

Figure 16:
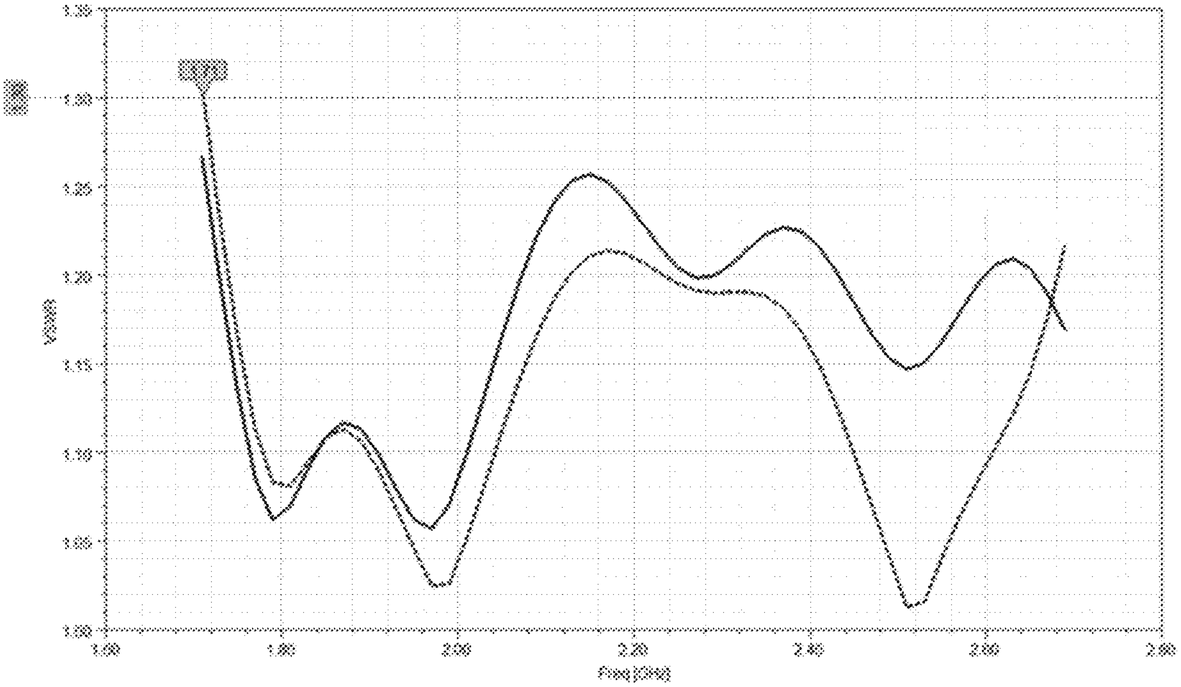
FIG. 16 is a schematic diagram of a standing wave ratio of a transparent antenna according to an embodiment of the present disclosure.
Figure 17:
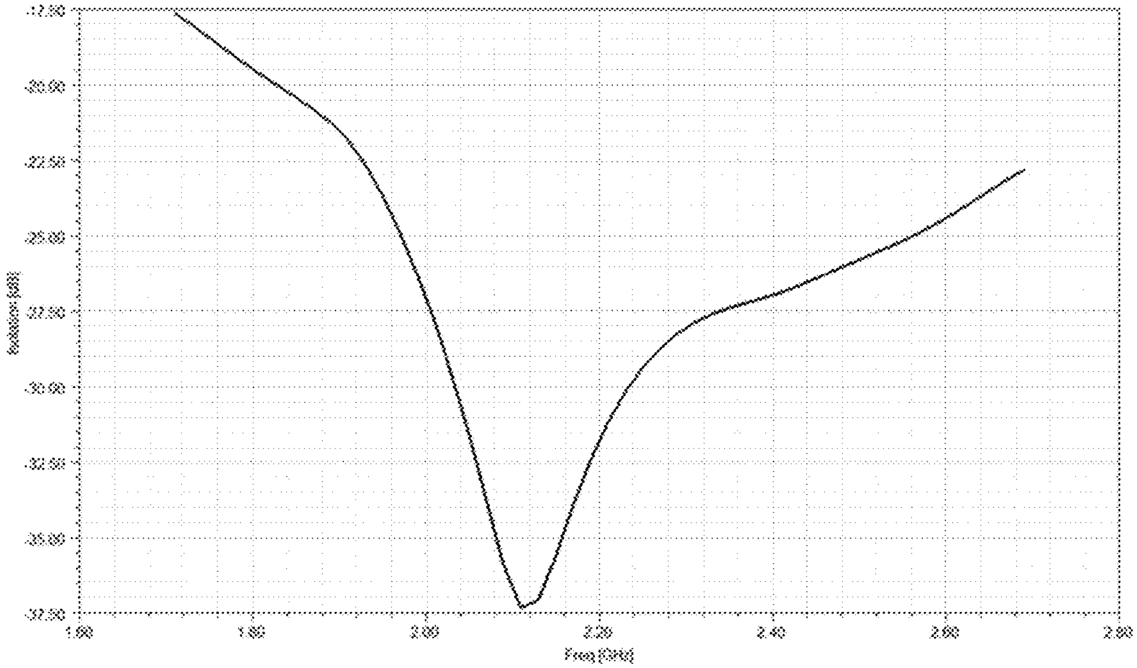
FIG. 17 is a schematic diagram of an isolation of a transparent antenna according to an embodiment of the present disclosure.
Figure 18:
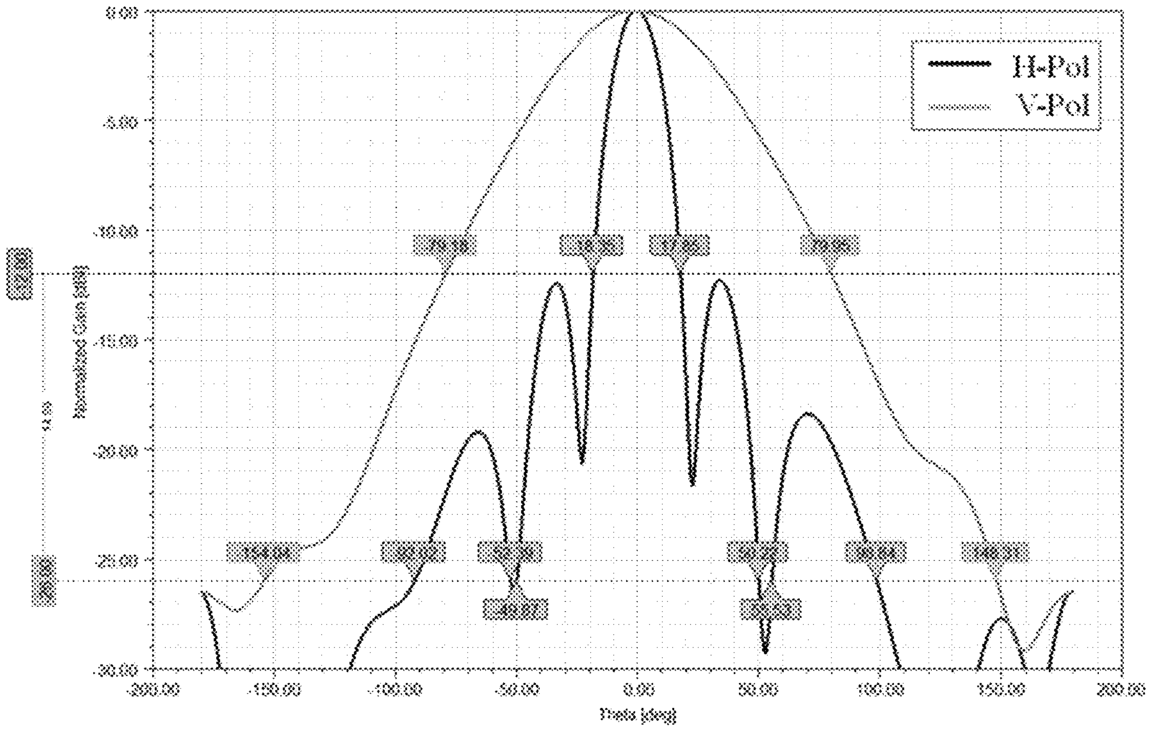
FIG. 18 is a schematic diagram illustrating a directional chart of a transparent antenna at a center frequency according to an embodiment of the present disclosure.
Figure 19:
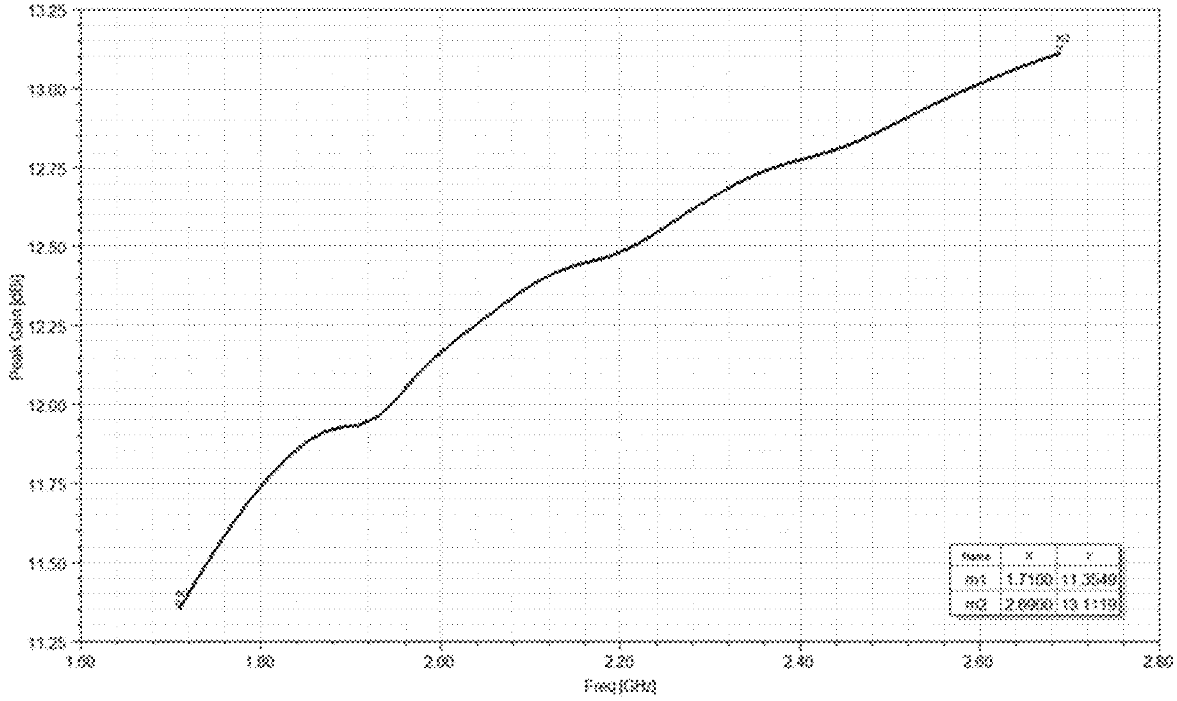
FIG. 19 is a schematic diagram illustrating a gain of a transparent antenna varying with a frequency according to an embodiment of the present disclosure.
Figure 20:
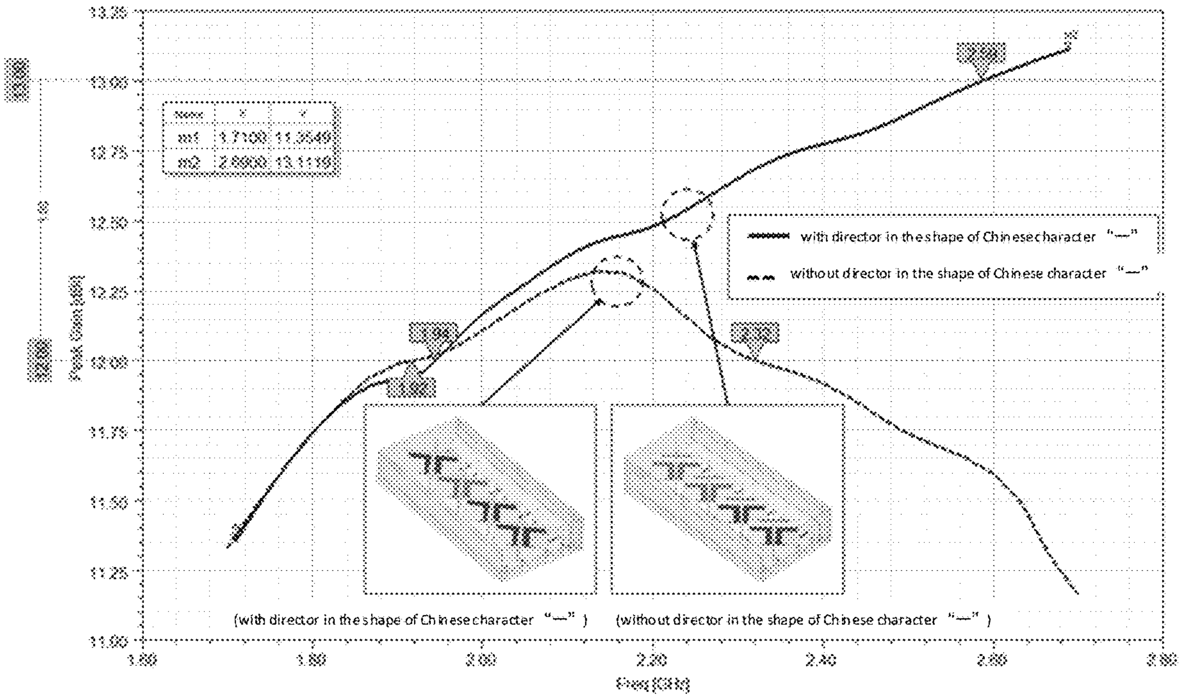
FIG. 20 is a schematic diagram illustrating effect of introducing and not introducing a director in a shape of Chinese character 一 on a gain of a transparent antenna according to an embodiment of the present disclosure.
Figure 21:
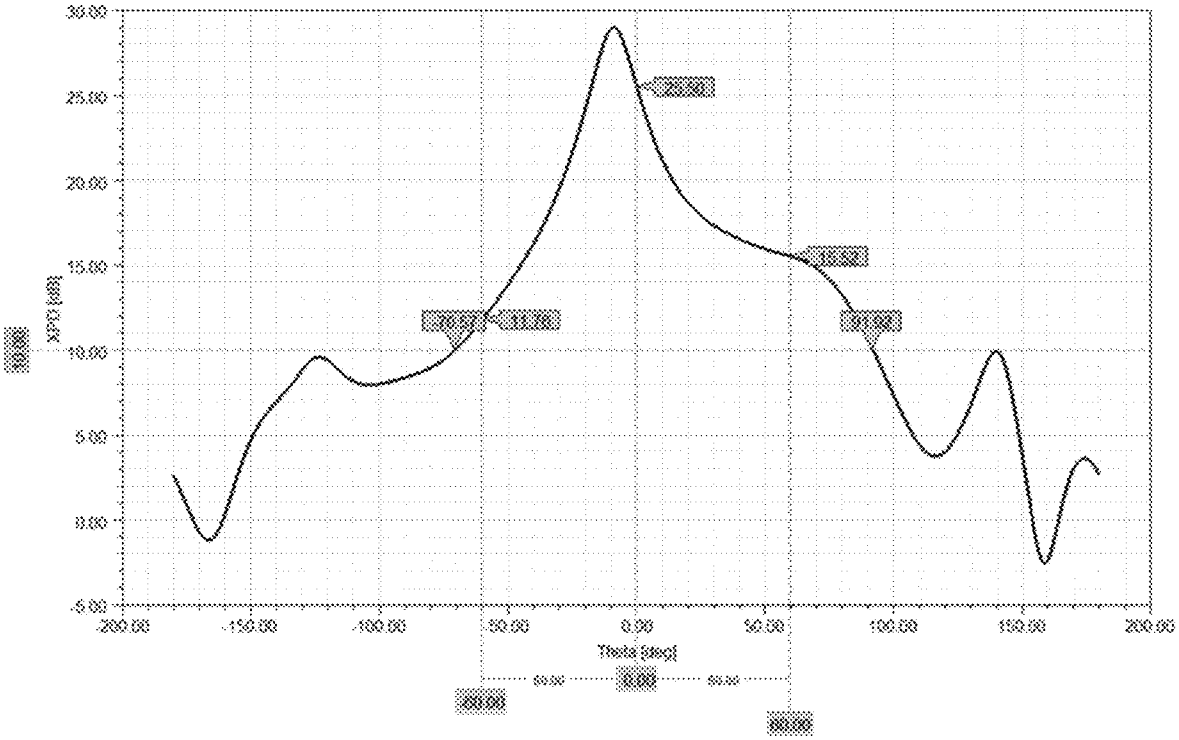
FIG. 21 is a schematic diagram of a cross-polarization ratio of a transparent antenna according to an embodiment of the present disclosure.

As shown in FIG. 1, the transparent antenna includes four radiating structures 2, and each of the first radiating element 211 and the second radiating element 221 in each radiating structure 2 employs the T-shaped dipole oscillator. The T-shaped dipole oscillator, the director in the shape of Chinese character “ ”, the first balun feed structure 212 and the second balun feed structure each are of a metal mesh structure. A size of the antenna is about 380 mm×183 mm×83 mm (2.79λc×1.34λc×0.61λc, represents a wavelength at a center frequency). A pitch between the radiating structures 2 is about 90 mm (0.66λc). FIG. 16 is a schematic diagram of a standing wave ratio of a transparent antenna according to an embodiment of the present disclosure, as shown in FIG. 16, under a standard that the standing wave ratio is less than 1.3, the transparent antenna can cover a frequency band from 1710 MHz to 2690 MHz, and has a characteristic of broadband of 980 MHz. The transparent antenna of the embodiment of the present disclosure has excellent broadband characteristics, ensuring a wide application scenario of the transparent antenna of the embodiment of the present disclosure. FIG. 17 is a schematic diagram of an isolation of a transparent antenna according to an embodiment of the present disclosure, as shown in FIG. 17, the transparent antenna according to the embodiment of the disclosure has an isolation greater than 17.5 dB at an operating frequency, and can ensure an excellent isolation greater than 25 dB in a frequency band from 2000 MHz to 2600 MHz (a bandwidth of 600 MHz), thereby reducing signal crosstalk between radio frequency ports, and improving communication quality. FIG. 18 is a schematic diagram of a directional chart of a transparent antenna at a center frequency according to an embodiment of the present disclosure, as shown in FIG. 18, a 3 dB vertical beam width of the transparent antenna is 65°±5°, and a 3 dB horizontal beam width of the transparent antenna is 20°±3°. The transparent antenna in the embodiment of the present disclosure has a relatively large field angle on a vertical radiation plane, can effectively cover a wider area, and has a narrower beam width on a horizontal radiation plane, so that the accuracy in the radiation direction is improved. FIG. 19 is a schematic diagram illustrating a gain of a transparent antenna varying with a frequency according to an embodiment of the present disclosure, and as shown in FIG. 19, the transparent antenna according to the embodiment of the present disclosure can achieve a high gain greater than 11 dBi, the gain is greater than 12 dBi in a frequency band from 2000 MHz to 2600 MHz (a bandwidth of 600 MHz), and particularly the gain is greater than 13 dBi in a frequency band from 2.6 GHz to 2.69 GHz (a bandwidth of 90 MHz), which greatly ensures excellent signal transceiving capability of the transparent antenna according to the embodiment of the present disclosure. FIG. 20 is a schematic diagram illustrating effect of introducing and not introducing a director in a shape of Chinese character “—” on a gain of a transparent antenna according to an embodiment of the present disclosure, as shown in FIG. 20, when the director in the shape of Chinese character “ -” is not introduced, the transparent antenna cannot achieve a gain greater than 12 dBi at a high frequency band above 2320 MHz, and the transparent antenna introduced with the director in the shape of Chinese character “—” compensates the gain of the antenna at a relatively high frequency (i.e., at a frequency above 2320 MHz) to achieve a gain greater than 12 dBi, and even in the frequency band from 2600 MHz to 2690 MHz, the gain can achieve a radiation characteristic with a high gain greater than 13 dBi. FIG. 21 is a schematic diagram of cross-polarization ratio of a transparent antenna according to an embodiment of the present disclosure, as shown in FIG. 21, the transparent antenna according to the embodiment of the present disclosure has an excellent cross-polarization ratio, the cross-polarization ratio in an axial direction (0° radiation direction) is greater than 25 dB, and the cross-polarization ratio in ±60° direction is greater than 11 dB, which ensures that signals received by dual polarization are not correlated with each other.

Figure 22:
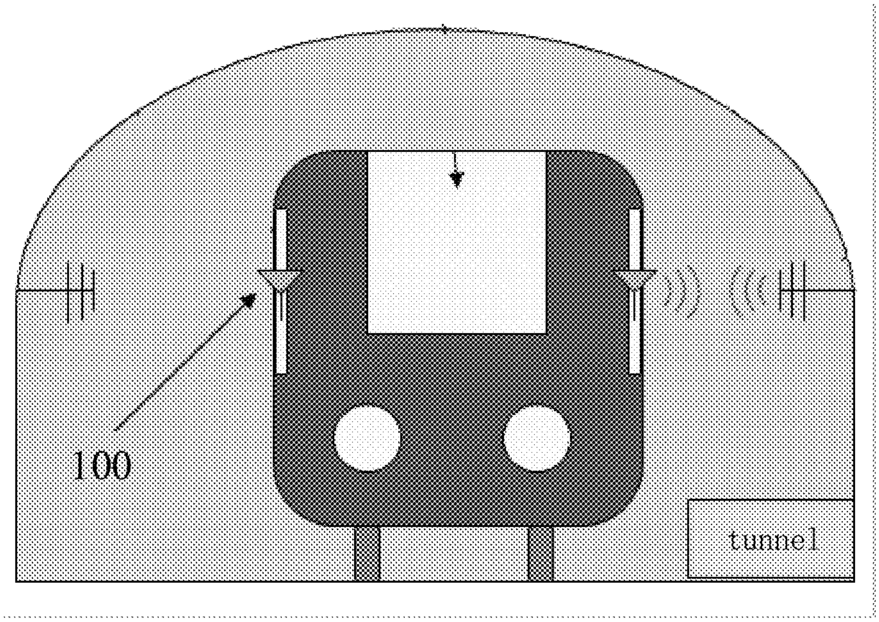
FIG. 22 is a schematic diagram of a communication system being applied to a glass window according to an embodiment of the present disclosure.

In a second aspect, an embodiment of the present disclosure provides a communication system, which may include the above-mentioned transparent antenna 1, and the transparent antenna 1 may be fixed on a glass window, for example, on the glass at two sides of a train, as shown in FIG. 22. Certainly, the communication system of the embodiment of the present disclosure may also be used in a base station.

The glass window system in the embodiment of the present disclosure may be used in glass window systems including, but not limited to, automobiles, trains (including high-speed rail), aircraft, buildings, or the like. The transparent antenna 1 may be fixed to an inner side of the glass window (a side closer to the room). Since the optical transmittance of the transparent antenna 1 is relatively high, the transparent antenna 1 has little influence on the transmittance of the glass window while realizing the communication function, and the transparent antenna 1 is also a tend of beautifying an antenna. The glass window in the embodiment of the present disclosure includes, but is not limited to, double glass, and the type of the glass window may also be single glass, laminated glass, thin glass, thick glass, or the like.

Figure 23:
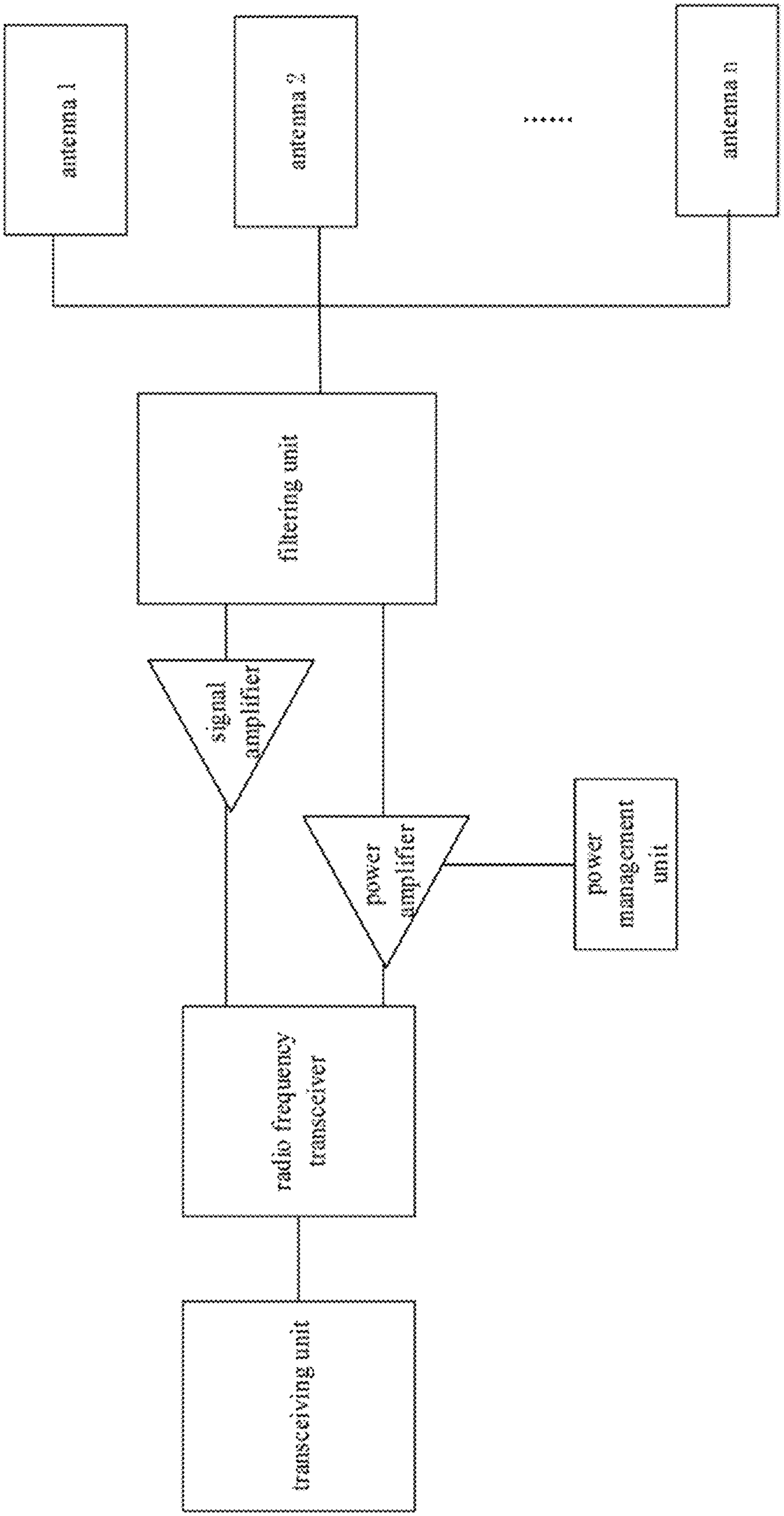
FIG. 23 is a schematic diagram of a communication system according to an embodiment of the present disclosure.

FIG. 23 is a schematic diagram of a communication system according to an embodiment of the present disclosure; as shown in FIG. 23, in some examples, the communication system provided in the embodiment of the present disclosure further includes a transceiver unit, a radio frequency transceiver, a signal amplifier, a power amplifier, and a filtering unit. The transparent antenna 1 in the communication system may be used as a transmitting antenna or as a receiving antenna. The transceiver unit may include a baseband and a receiving terminal, where the baseband provides a signal of at least one frequency band, for example, provides a 2G signal, a 3G signal, a 4G signal, a 5G signal or the like, and transmits the signal of the at least one frequency band to the radio frequency transceiver. After receiving the signal, the transparent antenna 1 in the communication system may transmit the signal to the receiving terminal in the transceiver unit after processing the signal by the filtering unit, the power amplifier, the signal amplifier, and the radio frequency transceiver, where the receiving terminal may be, for example, an intelligent gateway.

Furthermore, the radio frequency transceiver is connected with the transceiver unit and is used for modulating the signal transmitted by the transceiver unit or demodulating the signal received by the transparent antenna and then transmitting the signal to the transceiver unit. Specifically, the radio frequency transceiver may include a transmitting circuit, a receiving circuit, a modulating circuit, and a demodulating circuit, where after the transmitting circuit receives multiple types of signals provided by the baseband, the modulating circuit may modulate the multiple types of signals provided by the baseband and then transmit the signals to the antenna. The transparent antenna receives the signals and transmits the signals to the receiving circuit of the radio frequency transceiver, the receiving circuit transmits the signals to the demodulating circuit, and the demodulating circuit demodulates the signals and transmits the demodulated signals to the receiving terminal.

Furthermore, the radio frequency transceiver is connected with the signal amplifier and the power amplifier, the signal amplifier and the power amplifier are further connected with the filtering unit, and the filtering unit is connected with at least one transparent antenna 1. In the process of transmitting a signal by the communication system, the signal amplifier is used for improving signal-to-noise ratio of the signal output by the radio frequency transceiver and then transmitting the signal to the filtering unit; the power amplifier is used for amplifying the power of the signal output by the radio frequency transceiver and then transmitting the signal to the filtering unit; the filtering unit specifically includes a duplexer and a filtering circuit, the filtering unit combines signals output by the signal amplifier and the power amplifier and filters noise waves from the signal and then transmits the signal to the transparent antenna, and the transparent antenna 1 radiates the signal. In the process of receiving a signal by the communication system, after receiving the signal, the transparent antenna 1 transmits the signal to the filtering unit, the filtering unit filters noise waves from the signal received by the antenna and then transmits the signal to the signal amplifier and the power amplifier, the signal amplifier adjusts the gain of the signal received by the transparent antenna 1 to increase the signal-to-noise ratio of the signal; the power amplifier amplifies the power of the signal received by the transparent antenna 1. The signal received by the transparent antenna 1 is processed by the power amplifier and the signal amplifier and then transmitted to the radio frequency transceiver, and the radio frequency transceiver transmits the signal to the transceiver unit.

In some examples, the signal amplifier may include multiple types of signal amplifiers, such as a low noise amplifier, which is not limited herein.

In some examples, the communication system provided by the embodiment of the present disclosure further includes a power management unit, which is connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to those skilled in the art that various modifications and improvements may be made without departing from the spirit and scope of the disclosure, and such modifications and improvements are also considered to be within the scope of the disclosure.

What is claimed is:

1. A transparent antenna, comprising:

a first backplane comprising a first dielectric layer, a first electrode layer, a plurality of first transmission lines and a plurality of second transmission lines, wherein the first dielectric layer comprises a first surface and a second surface which are opposite to each other, and the first electrode layer is located on the first surface of the first dielectric layer; the plurality of first transmission lines and the plurality of second transmission lines are located on the second surface of the first dielectric layer;

at least one radiating structure, which is located on the second surface of the first dielectric layer, and each radiating structure comprises:

a first antenna dielectric plate comprising a second dielectric layer, a first radiating element and a first balun feed structure, wherein the second dielectric layer comprises a third surface and a fourth surface which are opposite to each other; the third surface of the second dielectric layer intersects the first surface of the first dielectric layer; the second dielectric layer is fixed on the second surface of the first dielectric layer; the first radiating element is located on the third surface of the second dielectric layer, and the first balun feed structure is located on the fourth surface of the second dielectric layer; the first balun feed structure is electrically connected with one of the first transmission lines, and the first radiating element is electrically connected with the first electrode layer;

a second antenna dielectric plate comprising a third dielectric layer, a second radiating element and a second balun feed structure, wherein the third dielectric layer comprises a fifth surface and a sixth surface which are opposite to each other, the fifth surface of the third dielectric layer intersects the first surface of the first dielectric layer, the third dielectric layer intersects the second dielectric layer and is fixed on the second surface of the first dielectric layer; the second radiating element is located on the fifth surface of the third dielectric layer, and the second balun feed structure is located on the sixth surface of the third dielectric layer; the second balun feed structure is electrically connected with one of the second transmission lines, and the second radiating element is electrically connected with the first electrode layer.

2. The transparent antenna of claim 1, wherein at least one of the first electrode layer, the first radiating element, the second radiating element, the first balun feed structure, the second balun feed structure, the first transmission line, and the second transmission line is of a metal mesh structure, and the metal mesh structure has a line width of each line ranging from 2 μm to 30 μm, a line thickness of each line ranging from 1 μm to 10 μm, an a spacing between any two adjacent lines ranging from 50 μm to 250 μm.

3. The antenna structure of claim 1, wherein the second dielectric layer has a first side edge and a second side edge opposite to each other; the third dielectric layer comprises a third side edge and a fourth side edge opposite to each other, the first side edge and the third side edge both are fixed on the first dielectric layer;

a first slot is provided in the first side edge of the second dielectric layer, a second slot is provided in the fourth side edge of the third dielectric layer, and the second dielectric layer and the third dielectric layer are inserted into each other through the first slot and the second slot; or a first slot is provided in the second side edge of the second dielectric layer, a second slot is provided in the third side edge of the third dielectric layer, and the second dielectric layer and the third dielectric layer are inserted into each other through the first slot and the second slot.

4. The transparent antenna of claim 3, wherein the first slot passes through a center of the second dielectric layer along a central axis of the first slot in a depth direction of the first slot; the second slot passes through a center of the third dielectric layer along a central axis of the second slot in a depth direction of the second slot, and the second side edge of the second dielectric layer and the fourth side edge of the third dielectric layer are coplanar;

the first radiating element is mirror-symmetrical with respect to the central axis of the first slot in the depth direction of the first slot as a symmetry axis; the second radiating element is mirror-symmetrical with respect to the central axis of the second slot in the depth direction of the second slot as a symmetry axis; and the first radiating element and the second radiating element are both T-shaped dipole oscillators.

5. The transparent antenna of claim 4, wherein the first radiating element comprises a first dipole arm and a second dipole arm, the second radiating element comprises a third dipole arm and a fourth dipole arm, the first antenna dielectric plate further comprises a first director and a second director, and the second antenna dielectric plate further comprises a third director and a fourth director;

the first director and the second director are both located on the third surface of the second dielectric layer, and the first director is located on a side of the first dipole arm away from the first backplane and the second director is located on a side of the second dipole arm away from the first backplane;

the third director and the fourth director are both located on the fifth surface of the third dielectric layer, and the third director is located on a side of the third dipole arm away from the first backplane, and the fourth director is located on a side of the fourth dipole arm away from the first backplane.

6. The transparent antenna of claim 5, wherein the first antenna dielectric plate comprises a first metal layer on the third surface of the second dielectric layer; the second antenna dielectric plate comprises a second metal layer on the fifth surface of the third dielectric layer;

the first metal layer comprises the first radiating element, the first director and the second director, and the second metal layer comprises the second radiating element, the third director and the fourth director.

7. The transparent antenna of claim 5, wherein the second dielectric layer has a first connection portion and a second connection portion, the third dielectric layer has a third connection portion and a fourth connection portion, and the first dielectric layer has a first through hole, a second through hole, a third through hole and a fourth through hole therein;

the first connection portion is fixedly connected with the first through hole, and the second connection portion is fixedly connected with the second through hole, so that the second dielectric layer is fixedly connected with the first dielectric layer; the third connection portion is fixedly connected with the third through hole, and the fourth connection portion is fixedly connected with the fourth through hole, so that the third dielectric layer is fixedly connected with the first dielectric layer.

8. The transparent antenna of claim 7, wherein a first conductive portion is provided on the first connection portion, the first conductive portion being electrically connected to the first dipole arm; a second conductive portion is provided on the second connection portion, the second conductive portion being electrically connected to the second dipole arm; a third conductive portion is provided on the third connection portion, the third conductive portion being electrically connected to the third dipole arm; a fourth conductive portion is provided on the fourth connection portion, the fourth conductive portion being electrically connected to the fourth dipole arm;

a first connection pad corresponding to the first through hole, a second connection pad corresponding to the second through hole, a third connection pad corresponding to the third through hole and a fourth connection pad corresponding to the fourth through hole are provided on the first electrode layer; the first conductive portion is electrically connected with the first connection pad, the second conductive portion is electrically connected with the second connection pad, the third conductive portion is electrically connected with the third connection pad, and the fourth conductive portion is electrically connected with the fourth connection pad.

9. The transparent antenna of claim 1, further comprising: a first feeding unit and a second feeding unit, each of the first feeding unit and the second feeding unit comprises a first feeding port and at least one second feeding port;

one of the at least one second feeding port of the first feeding unit is connected with one of the first transmission lines, and one of the second feeding port of the second feeding unit is connected with one of the at least one second transmission lines, wherein the first feeding unit and the second feeding unit are located on a printed circuit board.

10. The transparent antenna of claim 9, wherein the number of the first transmission lines and the number of the second transmission lines each are 2n, the first feeding unit comprises n stages of third transmission lines, and the second feeding unit comprises n stages of fourth transmission lines;

one of the third transmission lines at a first stage is connected with two adjacent ones of the first transmission lines, and different ones of the third transmission lines at the first stage are connected with different ones of the first transmission lines; one of the third transmission lines at an mth stage is connected with two adjacent ones of the third transmission lines at an (m−1)th stage, and different ones of the third transmission lines at the mth stage are connected with different ones of the third transmission lines at the (m−1)th stage;

one of the fourth transmission lines at the first stage is connected with two adjacent ones of the second transmission lines, and different ones of the fourth transmission lines at the first stage are connected with different ones of the second transmission lines; one of the fourth transmission lines at the mth stage is connected with two adjacent ones of the fourth transmission lines at the (m−1)th stage, different ones of the fourth transmission lines at the mth stage are connected with different ones of the fourth transmission lines at the (m−1)th stage, wherein $n \geq 2$, $2 \leq m \leq n$, and both m and n are integers.

11. The transparent antenna of claim 9, further comprising: a first side plate and a second side plate which are opposite to each other, wherein the first side plate and the second side plate are respectively connected to two side edges of the first backplane which are opposite to each other in a width direction of the first backplane, a plane where the first side plate is located and a plane where the second side plate is located are intersected with a plane where the first backplane is located, the first side plate is closer to the first transmission lines and the second transmission lines than the second side plate, and the printed circuit board is fixed on a surface of the first side plate away from the second side plate.

12. The transparent antenna of claim 11, wherein the printed circuit board is fixed to the first side plate by bolting, or the transparent antenna further comprises: an antenna housing, wherein the first backplane, the first side plate and the second side plate are all arranged in the antenna housing and are fixed to the antenna housing.

13. The transparent antenna of claim 11, wherein the first backpane, the first side plate, and the second side plate are in one piece;

the antenna housing comprises a second backplane, the first backplane being fixedly connected with the second backplane, and the second backplane comprises protruding portions and recessing portions which are alternately arranged, the protruding portions being fixed to the first backplane by bolting.

14. The transparent antenna of claim 1, wherein the first dielectric layer comprises a first base material, a first fixing plate and a second base material which are stacked, a surface of the first base material away from the first fixing plate is the first surface of the first dielectric layer, a surface of the second base material away from the first fixing plate is the second surface of the first dielectric layer;

the first base material is fixedly connected with the first fixing plate by a first adhesive layer; the second base material is fixedly connected with the first fixing plate by a second adhesive layer; and a material of the first fixing plate comprises polycarbonate; a material of the first base material and the second base material comprises polyethylene terephthalate or polyimide.

15. The transparent antenna of claim 1, wherein the second dielectric layer comprises a third base material, a second fixing plate and a fourth base material which are stacked, a surface of the third base material away from the second fixing plate is the third surface of the second dielectric layer, and a surface of the fourth base material away from the second fixing plate is the fourth surface of the second dielectric layer, and wherein the third base material is fixedly connected with the second fixing plate by a third adhesive layer, and the fourth base material is fixedly connected with the second fixing plate by a fourth adhesive layer; and a material of the second fixing plate comprises polycarbonate, a material of the third base material and the fourth base material comprises polyethylene terephthalate or polyimide.

16. The transparent antenna of claim 1, wherein the third dielectric layer comprises a fifth base material, a third fixing plate and a sixth base material which are stacked, a surface of the fifth base material away from the third fixing plate is the fifth surface of the third dielectric layer, and a surface of the sixth base material away from the third fixing plate is the sixth surface of the third dielectric layer, and wherein the fifth base material is fixedly connected with the third fixing plate by a fifth adhesive layer, and the sixth base material is fixedly connected with the third fixing plate by a sixth adhesive layer; and a material of the third fixing plate comprises polycarbonate, a material of the fifth base material and the sixth base material comprises polyethylene terephthalate or polyimide.

17. The transparent antenna of claim 1, wherein the first balun feed structure and the second balun feed structure each comprise a strip-shaped balun feed structure, and wherein the first balun feed structure is connected with the first transmission line by means of soldering; and/or the second balun feed structure is connected with the second transmission line by means of soldering.

18. A communication system, comprising the transparent antenna of claim 1.

19. The communication system of claim 18, wherein the transparent antenna is fixed to a surface of a glass window, or the transparent antenna is fixed to a base station.

20. The communication system of claim 18, further comprising:

a transceiving unit configured to transmit or receive a signal;

a radio frequency transceiver, which is connected with the transceiving unit and configured to modulate the signal transmitted by the transceiving unit or demodulate a signal received by the antenna and then transmit the signal to the transceiving unit;

a signal amplifier, which is connected with the radio frequency transceiver and is configured to improve a signal-to-noise ratio of the signal output by the radio frequency transceiver or the signal received by the antenna;

a power amplifier, which is connected with the radio frequency transceiver and is configured to amplify power of the signal output by the radio frequency transceiver or the signal received by the antenna; and a filtering unit, which is connected with the signal amplifier, the power amplifier and the transparent antenna, and is configured to filter the received signal and then transmit the filtered signal to the transparent antenna or filter the signal received by the antenna.

* * * * *